United States Patent [19]
Tanaka et al.

[11] Patent Number: 5,594,464
[45] Date of Patent: Jan. 14, 1997

[54] LIQUID CRYSTAL DISPLAY DEVICE HAVING TWO METASTABLE STATES AND DRIVING METHOD THEREFOR

[75] Inventors: Takaaki Tanaka; Yuzuru Sato; Hiroaki Nomura, all of Suwa, Japan

[73] Assignee: Seiko Epson Corporation, Tokyo-to, Japan

[21] Appl. No.: 59,226

[22] Filed: May 7, 1993

[30]     Foreign Application Priority Data

| May 7, 1992 | [JP] | Japan | 4-114480 |
| Jun. 2, 1992 | [JP] | Japan | 4-141442 |
| Jul. 12, 1992 | [JP] | Japan | 4-326914 |
| Jul. 16, 1992 | [JP] | Japan | 4-189437 |
| Aug. 17, 1992 | [JP] | Japan | 4-217932 |
| Dec. 7, 1992 | [JP] | Japan | 4-326915 |
| Apr. 26, 1993 | [JP] | Japan | 5-121996 |

[51] Int. Cl.$^6$ .................................................. G09G 3/36
[52] U.S. Cl. ...................................... 345/94; 345/95
[58] Field of Search ............................... 345/87, 89, 94, 345/95; 359/85, 91, 60, 56, 102, 63

[56]     References Cited

U.S. PATENT DOCUMENTS

| 3,837,730 | 9/1974 | Hatfield et al. | 350/160 R |
| 4,239,345 | 12/1980 | Berreman et al. | 350/331 R |
| 4,333,708 | 6/1982 | Boyd et al. | 350/346 |
| 4,411,496 | 10/1983 | Nonomura et al. | 359/85 |
| 4,505,548 | 3/1985 | Berreman et al. | 350/346 |
| 4,529,271 | 7/1985 | Berreman et al. | 350/333 |
| 4,566,758 | 1/1986 | Bos | 350/346 |
| 4,582,396 | 4/1986 | Bos et al. | 350/347 B |
| 4,601,542 | 7/1986 | Meyer | 350/334 |
| 4,601,543 | 7/1986 | Boyd et al. | 350/334 |
| 4,601,544 | 7/1986 | Chang et al. | 350/334 |
| 4,717,243 | 1/1988 | Boyd et al. | 350/332 |
| 4,770,500 | 9/1988 | Kalmanash et al. | 350/347 E |
| 5,095,376 | 3/1992 | Umeda et al. | 359/56 |
| 5,189,535 | 2/1993 | Mochizuki et al. | 345/94 |
| 5,287,205 | 2/1994 | Yamazaki et al. | 345/94 |
| 5,488,499 | 1/1996 | Tanaka et al. | 357/102 |

FOREIGN PATENT DOCUMENTS

| 1010136 | 5/1977 | Canada . |
| 422904 | 4/1991 | European Pat. Off. . |
| 579247 | 1/1994 | European Pat. Off. . |
| 58-420 | 4/1984 | Japan . |
| 219720 | 12/1984 | Japan . |
| 196728 | 10/1985 | Japan . |
| 26368 | 4/1991 | Japan . |
| 2233106 | 1/1991 | United Kingdom . |

OTHER PUBLICATIONS

Numerical modelling of twisted nematic devices; D. W. Berreman; Bell Laboratories, New Jersey; Phil. Trans. R. Soc. Lond. A, pp. 203–216, 1983.

Robert B. Meyer and R. N. Thurston, "Discovery of DC Switching of a Bistable Boundary layer Liquid Crystal Display", Applied Physics Letters, vol. 43(4), pp. 342–344, Aug. 15, 1983.

M. Schadt and W. Helfrich entitled, "Voltage–Dependent Optical Activity of A Twisted Nematic Liquid Crystal", Applied Physics Letters, vol. 18(4), pp. 127–128 (1971).

T. J. Scheffer and J. Nehring "A New, Highly Multiplexable Liquid Crystal Display", Applied Physics Letters, vol. 45(10), pp. 1021–1023 (Nov. 15, 1984).

*Primary Examiner*—Jeffery Brier
*Assistant Examiner*—Amare Mengistu
*Attorney, Agent, or Firm*—W. Glen Johnson

[57]     ABSTRACT

A high speed multiplex-driven liquid crystal display device is capable of utilizing a bistable nematic liquid crystal medium while maintaining high contrast, fast switching capability and a wide viewing angle. The chiral nematic liquid crystal medium has a twisted structure wherein a first voltage waveform applied in a first time period brings on Frederick's transition followed by a selected second voltage waveform applied in a second time period capable of generating one of two selectable metastable states representing switchable bistable states.

96 Claims, 29 Drawing Sheets

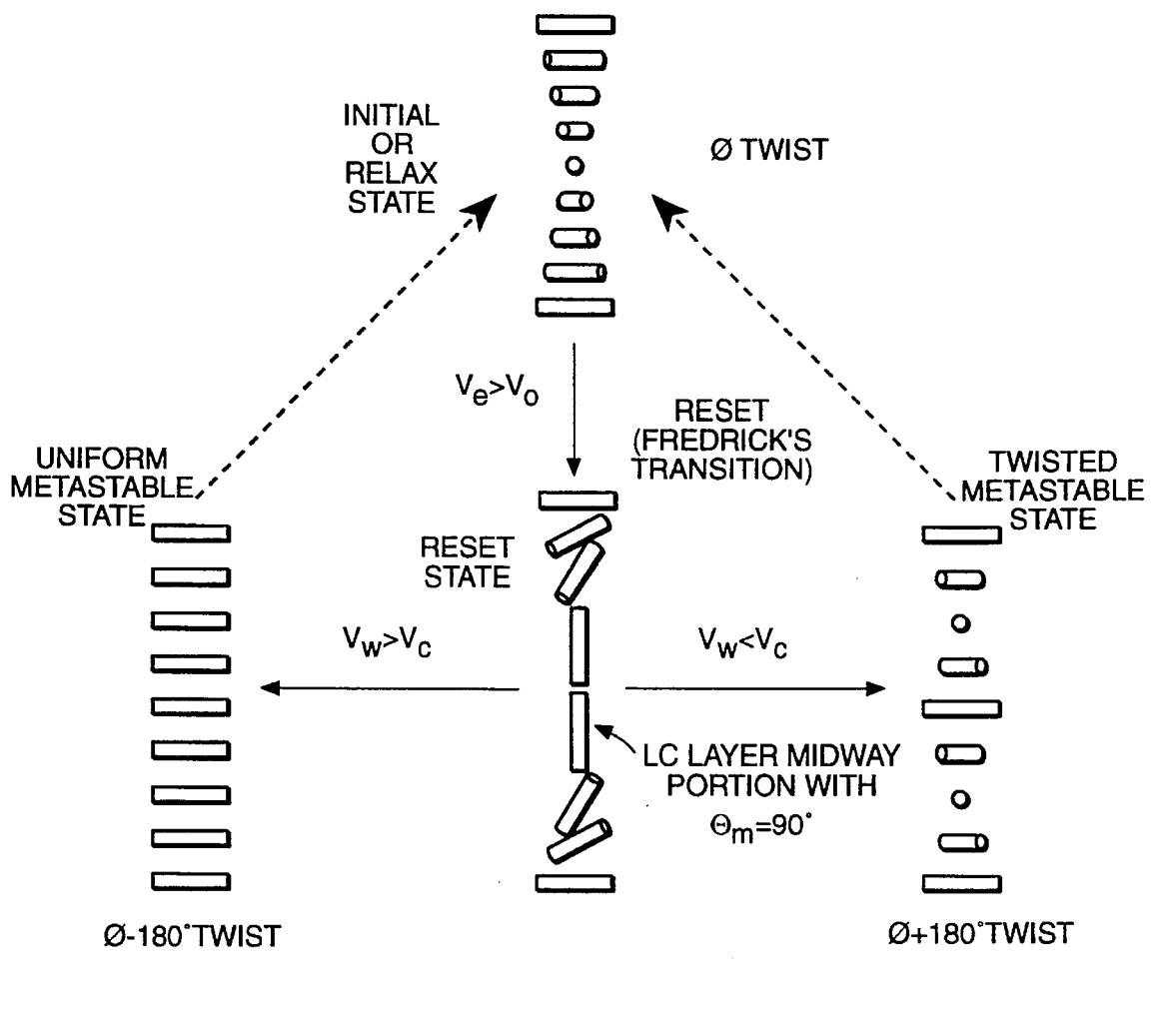
FIG._35

LIQUID CRYSTAL DISPLAY DEVICE HAVING TWO METASTABLE STATES AND DRIVING METHOD THEREFOR

BACKGROUND OF THE INVENTION

This invention generally relates to liquid crystal display devices and more particularly to liquid crystal display devices that have at least two bistable states which are metastable in nature.

Currently, liquid crystal display devices are generally employed as a visual display output in office equipment, e.g., personal computers, notebooks, fax machines and other such display apparatus. These devices generally employ either a twisted nematic (TN) liquid crystal medium or a supertwisted nematic (STN) liquid crystal medium. Examples of such display mediums are described in the article of M. Schadt and W. Helfrich entitled, "Voltage-Dependent Optical Activity of A Twisted Nematic Liquid Crystal", *Applied Physics Letters,* Vol. 18(4), pp. 127–128 (1971) and in the article of T. J. Scheffer and J. Nehring "A New, Highly Multiplexable Liquid Crystal Display", *Applied Physics Letters,* Vol. 45(10), pp. 1021–1023 (Nov. 15, 1984). These mediums do not have a lasting stable memory effect. Therefore, these mediums need to be actively driven, e.g., by a matrix driving method using voltage averaging or by an active matrix driving method in which a transistor or other active element is provided at each picture element or pixel.

Other liquid crystal (LC) systems are being currently researched and developed in addition to the foregoing, although they have not reached a reliable product stage. For example, high speed addressing technologies utilizing voltage averaging are disclosed in Japanese Laid-Open Patent 59-219720 and Japanese Laid-Open Patent Publication 60-196728. LC systems utilizing bistable switching properties are disclosed in Japanese Patent Laid-Open Publication 1-51818, which is equivalent to U.S. Pat. No. 4,239,345; Japanese Laid-Open Publication 3-26368; and Japanese Laid-Open Patent 59-58420.

However, these disclosed LC systems inherently have several problems. When a twisted nematic liquid crystal is driven by voltage averaging, the ratio of the voltage $V_{ON}$, for selecting the ON condition, to the voltage $V_{OFF}$, for selecting the OFF condition, is given by the following equation:

$$V_{ON}/V_{OFF}=((N^{1/2}+1)/(N^{1/2}-1))^{1/2},$$

wherein N is the number of scan lines.

As can be seen from this equation, as the $V_{ON}/V_{OFF}$ ratio approaches 1 as N becomes large, the contrast ratio falls. Considering the electrooptical characteristics and voltage waveforms of current liquid crystal mediums, N is limited to approximately 500 lines. Therefore, it is impossible to use this LC system to realize LC display devices for workstations, LC projection systems and the like requiring high precision displays. Also, the display characteristic is significantly dependent on the viewing angle, and, further, the switching time from the ON condition to the OFF condition is comparatively long.

The LC system disclosed in Japanese Laid-Open Patent 60-196728 is aimed at shortening the required switching time. By the disclosed addressing means in this publication, the switching from the ON condition to the OFF condition can be advanced by providing for opposite signs proscribed to the pretilt angle, $\theta_1$, on the lower substrate, i.e., the angle formed between the molecular director of the liquid crystal molecules in contact with the alignment layer formed on the substrate surface, and the pretilt angle, $\theta_2$, on the upper substrate. Also, Japanese Laid-Open Patent 59-219720 is aimed at stabilizing the operating condition by adding a chiral component to the liquid crystal medium. However, since these LC systems do not have bistable capabilities and are operated by the voltage averaging method, they are not suitable for use in high precision and high resolution display devices.

Existing operating LC systems having bistable characteristics or plural stable states are suited to high precision displays using many scan lines when switching between states can be selectively performed with suitably applied voltage waveforms. The term, "bistable", as used herein includes metastable states as well as any other pseudo states that can be maintained a period of time greater than the time required to change the entire display screen state. However, each of these bistable systems have their own inherent problems and drawbacks. For example, U.S. Pat. No. 4,239, 345 discloses bistable LC systems wherein data that has been written into the display can be retained in its written state for a long period of time without need for refresh or the continued maintenance of an ON condition or applied power for retention of its written state. However, since switching between the two stable states is basically performed by rapid cut off of the applied voltage and its gradual decline over approximately one second, this technology is not suited for use in conjunction with a simple matrix driving method and its writing speed is also extremely slow. Actually, U.S. Pat. No. 4,239,345 only describes a switching principle without disclosing a method for accomplishing a simple matrix drive system.

In Japanese Laid-Open Patent Publication 59-58420, the write voltage can be selected by controlling the applied voltage. However, in order to clear the display of written data, the liquid crystal medium must be heated until the medium takes on an isotropic phase. Furthermore, a significantly high voltage is required for writing into the display cells.

Also, in these LC systems having bistable characteristics or plural stable states, the applied stable state employed for display of data is frequently not sufficiently stable with respect to the applied energy.

Therefore, the molecular orientation state of the liquid crystal medium in the condition wherein the power to the display is cut off changes to a molecular orientation state of the lowest energy level. In cases wherein an initial state is involved, such as, in the case of the present invention, and where the molecular orientation states are several and are different, there is a problem in display write scanning, i.e., writing to the display. When write scanning is performed on the initial orientation state during display power up, three orientation states exist together, even through for a short period of time, which degrades display quality.

It is, therefore, an object of this invention to provide a high definition, high precision liquid crystal display device having bistable capabilities that can be driven by a simple matrix display method of operation.

SUMMARY OF THE INVENTION

According to this invention, a liquid crystal display device comprises a chiral nematic liquid crystal medium between a pair of transparent electrode substrates having alignment layers wherein the chiral nematic liquid crystal exhibits a twisted structure of twist angle, φ, in its initial state and has different twisted structures with different twist angles in at least two metastable states different from the initial state, which metastable states are relaxation states. These metastable states are reached from any arbitrary state of the display, including the initial state after the application of a voltage that first brings about Frederick's transition to the initial state before each selection time period. The applied voltage to bring about Frederick's transition is a voltage pulse greater than the threshold value for the initial state and the two metastable states. The voltage applied to select either one of the two metastable states is a selected voltage pulse employing a critical value that generates one of the two metastable states as a reference, i.e., a reliable standard condition, being one of two or more substantially stable or pseudo-stable states. Here, "metastable state" has the meaning of being sufficiently stable if it can be maintained a sufficiently longer period of time without power support than the period of time or speed required to change the displayed data on the display screen. Multiplex driving can be performed by using an applied voltage during the period the selected metastable state is maintained comprising a pulse having an amplitude lower than the threshold value of either of the two metastable states.

Assuming the directions of rubbing on the alignment layers, provided on a pair of transparent electrode substrates, form the angle, $\phi_r$, the spiral pitch of the chiral nematic liquid crystal is adjusted by adding a chiral component so that the twist angle in the initial state, prior to application of a voltage, will approximate $\phi_r$.

Assuming the angles formed by the molecular director of the liquid crystal molecules in contact with the respective alignment layers on the substrate surfaces are respectively $\theta_1$ and $\theta_2$ in the initial state, $\theta_1$ and $\theta_2$ will then have mutually opposite signs, as illustrated in FIG. 1. In other words, if the twist angle of the initial state of the chiral nematic liquid crystal medium is 180°, then, the molecular directors of the contacting liquid crystal molecules are substantially parallel.

A chiral nematic liquid crystal medium having two metastable states different from its initial state, comprising respective relaxation states, means that assuming, for example, it utilizes a twisted structure with a twist angle of 180° in its initial state, it can result in a twisted structure with one twist of 0° in a uniform state, and another twist angle of 360° in one of selectable metastable states. Relaxation to one of the metastable states after the imposition of Frederick's transition depends on the particular waveform of the applied pulse voltage. Both metastable states have the property of spontaneously relaxing to the initial state.

The twist angle, $\phi$, in the initial state is not limited to the foregoing example of 180° as any desired twist angle can be designed and set for the initial state. For example, a liquid crystal display device with a twist angle of 90° in the initial state has a twisted structure wherein the twist angles in the metastable states are, respectively, −90° and 270°. It has been experimentally confirmed that fast switching between the metastable states can be accomplished.

When the present invention is applied to a liquid crystal display device that utilizes a multiplex driving method, the drive voltages are voltage pulses divided up into an applied voltage in a first time period to generate Frederick's transition in the liquid crystal medium, followed by an applied voltage in a next or second time period to select one of the two metastable states. This is followed by a third applied voltage in a third time period to facilitate multiplex driving. In the first time period, a voltage pulse is applied having a sufficiently large absolute value to bring about Frederick's transition. The polarity of the applied voltage pulse in the first time period can be changed. The applied voltage in the second time period is employing a critical value that generates one of the metastable states as a reference, i.e., as a standard value. A desired metastable state can be selectively obtained selected by an applied voltage pulse having a voltage level either exceeding or not exceeding a critical value. When a voltage pulse whose absolute value is zero, i.e., no voltage signal is applied to the liquid crystal element or medium in the second time period, one of the metastable states is achieved. If the absolute value of the applied voltage pulse exceeds zero but does not exceed the critical value, the same metastable state will be selected. However, if a voltage pulse is applied in the second time period whose absolute value exceeds the critical value, then, the other metastable state will be selected.

In the first time period, Frederick's transition is brought about by applying a voltage pulse with an absolute value greater than the threshold value in either the initial state or the two metastable states. In the second time period, following the first time period, a voltage pulse is applied for selecting one or the other of two metastable states to bring about liquid crystal molecular arrangement characteristic of that state. This second time period voltage pulse may have either the same or opposite polarity of the polarity of the voltage pulse applied in the proceeding period, i.e., during the first period, with an absolute value of zero.

In another aspect of this invention, when the twist angle of the liquid crystal molecules in the initial state is $\phi$, the twist angles in the two metastable states generated as relaxation states, after applying a predetermined voltage pulse group in the initial state, respectively, approximate $\phi-180°$ and $\phi+180°$. In the first time period, on application of such an applied voltage pulse group, Frederick's transition in the initial state is achieved setting up two metastable states. With the application of a voltage pulse in a second time period whose absolute value exceeds the critical value and has a polarity opposite to that of the previously applied pulse at the end of the first time period, i.e., the last pulse of the initially applied voltage pulse group, a twisted metastable state is selected having a twist angle approximating $\phi-180°$. With the application of a voltage pulse whose absolute value does not exceed the critical value or whose absolute value is zero with a polarity the same as that of the previously applied pulse at the end of the first time period, a twisted metastable state is selected having a twist angle approximating $\phi+180°$.

A third period may be established immediately after the second period. The absolute value of the voltage pulse applied in the third period has a value lower than the threshold value existing between the two metastable states and facilitates multiplex driving.

As described above, by means of the liquid crystal display device of this invention, a high speed multiplex-drive liquid crystal display device can be achieved with a high contrast ratio and wide effective viewing angle by switching between two metastable states which can be selectively achieved by means of a selected and applied voltage waveform. Also, the selected state is retained as a memory state over a predetermined period of time, e.g., approximately 10 seconds, which is at least greater than the scanning time period to write one screen display, so that this invention can be easily applied to a high precision display having a comparatively large number of addressed scan lines and can be driven by a simple matrix driving method. This invention is also applicable not only to direct-view liquid crystal display devices but also applicable to various types of light valves, projection display systems, spatial light modulators, electronic photographic system printer heads and the like.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 35 graphically illustrates the basic concepts of the LCD driving techniques according to the present invention.

DESCRIPTION OF THE PREFERRED EMBODIMENTS

Figure 29A:
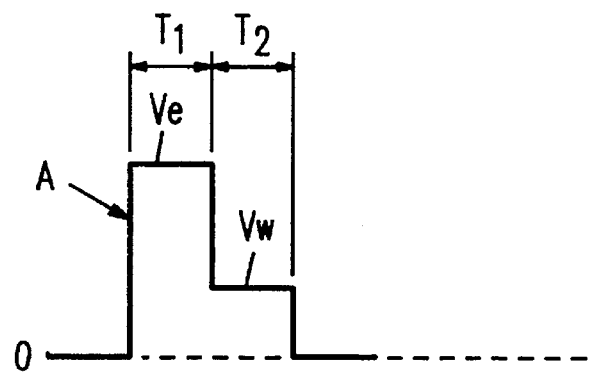
FIG. 29A is an illustration in its simplest form of the voltage pulse sequence for selection of one of two metastable states according to this invention.

Reference is now made first to FIG. 29A and the example waveform, A, for the purpose of explaining the relationship between Frederick's transition and a selected metastable state following such a transition. Waveform, A, is an example of the applied voltage pulse in the first time period, $T_1$, and in the second time period, $T_2$. In FIG. 29A, the voltage level of the applied voltage pulse in time period, $T_1$, is $|V_e|$ and the voltage level of the applied voltage pulse in time period, $T_2$, is $V_w$.

Figure 29B:
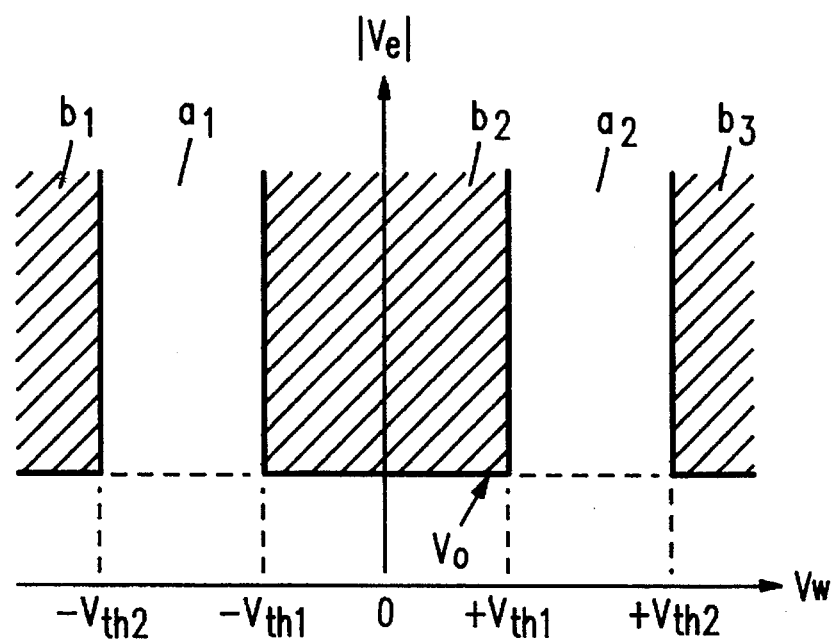
FIG. 29B graphically illustrates the selection areas of the metastable states for this invention.

The relationship between these applied voltage pulses is shown in FIG. 29B wherein the applied voltage, $|V_e|$, in the first time period, $T_1$, is represented along the vertical axis and the applied voltage, $V_w$, in the second time period, $T_2$, is represented along the horizontal axis. In the example here, the chiral nematic liquid crystal medium has a 180° twisted molecular structure in its initial state, and its metastable states respectively have a twist angle of 0°, shown at areas $a_1$, $a_2$ in FIG. 29B (referred to as the untwisted or uniform state), and a twist angle of 360°, shown in cross-hatch in areas $b_1$, $b_2$, $b_3$ in FIG. 29B (referred to as the twisted state). $V_0$ is the reset voltage required to bring about Frederick's transition i.e., the threshold voltage over which the $V_e$ level brings about this transition, and $V_{th1}$, $V_{th2}$ indicate, respectively, the critical values for the state in areas $a_1$, $a_2$ and for the state in areas $b_1$–$b_2$.

Relative to FIG. 29B, when $|V_e| > V_0$ and $|V_{th1}| < |V_w| < |V_{th2}|$, then the metastable states of areas $a_1$, $a_2$ can be selected.

When $|V_e|>V_o$ and $|V_w|<|V_{th1}|$ or $|V_e|>V_o$ and $|V_w|>|V_{th2}|$, then, the metastable states of areas $b_1$–$b_3$ is selected.

In the embodiments of this invention described below, the state of $a_1$ in the first through the sixth embodiments and the states represented by areas $a_1$ and $a_2$. in the seventh through the eleventh embodiments are selected as one metastable state, while the state of $b_2$ in the first through the tenth embodiments and the states represented by areas $b_3$ in the eleventh embodiment are selected as the other metastable state. In each of these embodiments, there is described a condition in which two critical values exist for selection of one or other of at least two metastable states. However, it should be understood that the existence of three or more critical values is possible.

As indicated above, either metastable state can be created by selecting the proper voltage as the applied voltage pulse in the second time period selecting the respectively appropriate critical value of $V_{th1}$ or $V_{th2}$ as a reference or standard. Therefore, a case can be considered in which either area $a_1$ ($a_2$) or $b_2$ is selected utilizing the critical value $|V_{th2}|$ as a reference or standard. Also, a case can be considered in which either area $a_1$ ($a_2$) or $b_1$ ($b_3$) is selected utilizing the critical value $|V_{th2}|$ as a reference. In other words, it is possible to select one of the metastable states in the second time period by applying either a voltage that is higher than the critical value or a voltage that is lower than the critical value employing the critical values that respectively generate the two metastable states as a reference or standard.

Reference is now made to the switching principle and driving method of the liquid crystal display device of the present invention. U.S. Pat. No. 4,239,345 discloses a bistable liquid crystal medium but does not explain how such a medium could be matrix driven for utilization in a display system. If a sufficiently large voltage is applied to bring about Frederick's transition, the liquid crystal molecules in the central portions or regions of the liquid crystal layer (i.e., at a distance from lower substrate surface equal to about one-half of the liquid crystal layer thickness), are aligned at an angle of about 90° with respect to the planar surface of the substrate. This condition is referred to as the reset state. If the applied voltage is thereafter gradually reduced over a period of about one second, then, the liquid crystal molecules in the central region revert to the orientation change when the voltage was initially applied, i.e., relaxing to a state parallel with the planar surface of the substrate. The orientation state achieved in this manner is termed the uniform (untwisted) state. However, if the applied voltage is suddenly cut off, the liquid crystal molecules in the central region of the liquid crystal layer move in a direction opposite to that of the case when the voltage is gradually reduced. This phenomenon is referred to as a "backflow" state in U.S. Pat. No. 4,239,345 and is due to the flow effect of the liquid crystal medium. Since the liquid crystal molecules in the central regions of the liquid crystal medium continue to move in an opposite direction and relax in a direction opposite to that of the liquid crystal molecules near the substrate surface, their relaxation state is in a 360° twisted state compared to the liquid crystal surface molecules.

As just indicated, the selection of two bistable states is performed by the foregoing principle of applied voltages. However, this technology had no practical application because the applied voltage must be gradually reduced over a period of time comprising about one second to order to achieve relaxation in the uniform state. In other words, it is theoretically impossible to apply this bistable state approach of U.S. Pat. No. 4,239,345 to high speed switching required in a liquid crystal display device by means of a multiplex driving method. However, research by the inventors herein has revealed that, by applying a suitable voltage after reset, the backflow state occurs and the liquid crystal molecules begin to relax to a 360° twisted state. However, then the direction of orientation change reverses, and the liquid crystal molecules begin to return to their original stable state. If the applied voltage is larger than a predetermined value, then the liquid crystal molecules continue to relax to the uniform state, but if it is smaller than a predetermined value, then their direction of orientation change again reverses and the liquid crystal molecules relax to the 360° twisted state. We have discovered that this predetermined value exists as a critical value through experimental simulation as well as actual experiment, and the present invention takes advantage of this newly discovered phenomenon.

The present invention operates as follows. Reference is made to FIG. 35 in explaining the basic concept of the driving method of this invention. Initially, the liquid crystal layer molecules are in an initial state, as shown in FIG. 35, having a twist, $\phi$. With the application of a reset voltage, $V_e$, which is higher than a threshold value, $V_0$, an intermediate or reset state is achieved, which is Fredrick's transition. As previously indicated, in this reset state, the liquid crystal molecules approximately midway of the liquid crystal layer are aligned so that their tilt angle, $\theta_m$, is about 90° with respect to the planar surface of the substrate. After reset, a pulse voltage is superposed on an applied bias voltage. Backflow will begin to occur upon reset and the liquid crystal molecules will begin to relax to the initial state. However, if the peak value or duration of the pulse voltage is greater than a predetermined value, $V_c$, then the direction of orientation change of the liquid crystal molecules will immediately reverse and the liquid crystal molecules resert to a uniform state, e.g., $\phi$–180°, a first metastable state. However, if the peak value or duration of the pulse voltage, $V_w$, is lower than a predetermined value $V_c$, the liquid crystal molecules will revert to a twisted state, e.g., $\phi$+180°, a second metastable state, as previously explained.

The above predetermined values, $V_c$, mentioned above, are the previous mentioned values $V_{th1}$ and $V_{th2}$. After a brief period of time, e.g., several minutes, the selected metastable state will relax to the initial state. It is possible to switch from one selected metastable state to the other metastable state through the reset state. Since switching can be performed by selectively adjusting the magnitude of the pulse voltage, facilitating extremely fast switching of the liquid crystal molecules thereby realizing application of bistable liquid crystal mediums to high precision liquid crystal displays. Generally, ON switching of display picture element can be accomplished in $\leq 10$ ms and OFF switching can be accomplished in a few 100 ms, but both of these values depend upon the type of liquid crystal medium employed and the thickness of the cell gap.

Figure 30:
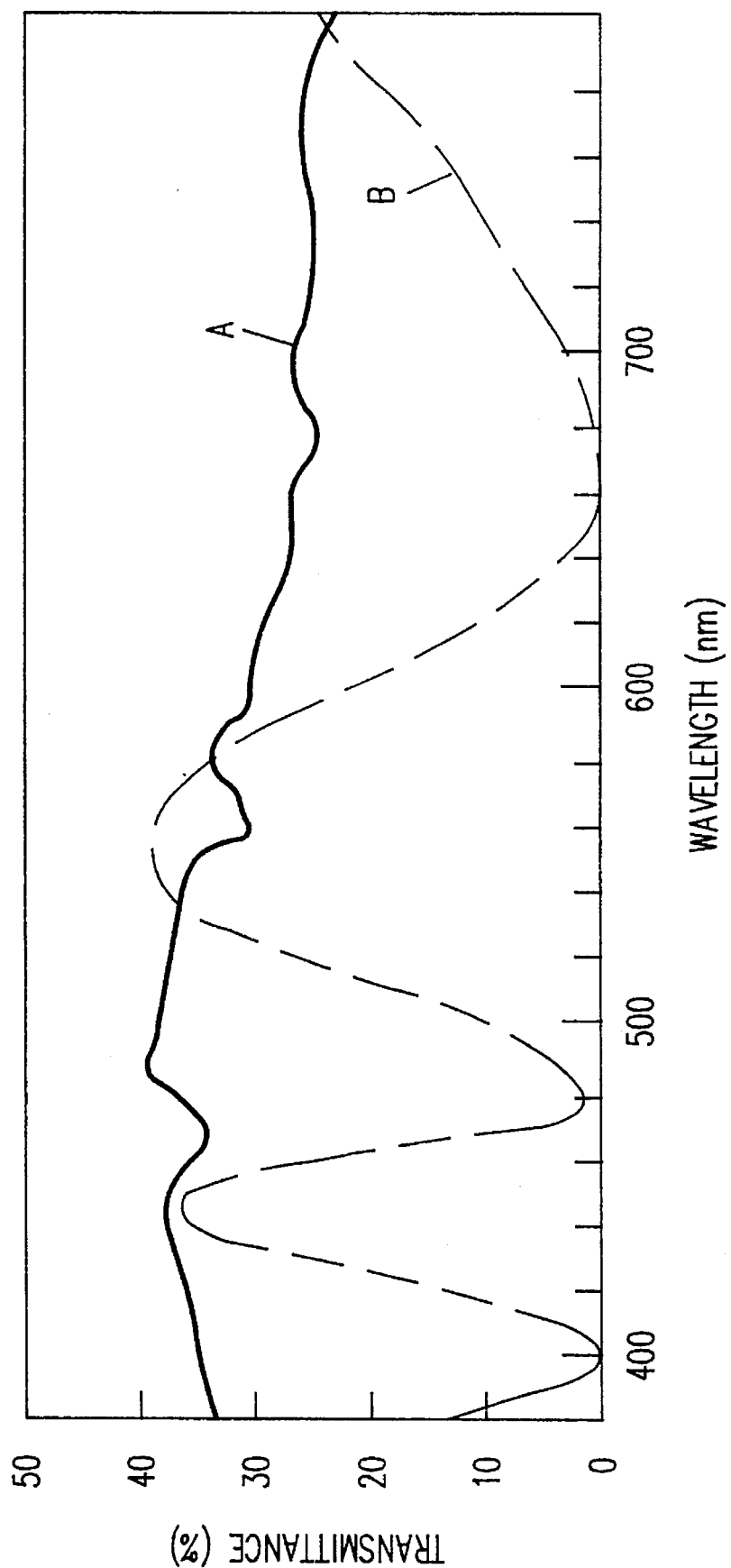
FIG. 30 is a graphic illustration of the spectral characteristics for respectively different liquid crystal medium gap dimensions for a metastable display device of this invention.

Reference is now made to the spectral characteristics of this invention as explained in connection with the liquid crystal display device disclosed in the eighth embodiment, which is described in detail later. FIG. 30 shows the spectral characteristic when an ON condition is selected through switching. The wavelength is indicated on the horizontal axis while the transmittance is indicated on the vertical axis.

Curve A in FIG. 30 is the spectral characteristic for a display element having a cell gap of 1.8 μm. To be noted is that a flat characteristic is obtained in the broad wavelength range of visible light thereby indicating good white light display. For comparison purposes, dash line curve B in FIG. 30 is the spectral characteristic for a display element having a cell gap of 20 μm. The presence of plural peaks in curve B indicates that the display is colored so that this type of element is useful with respect to a color display.

Figure 31:
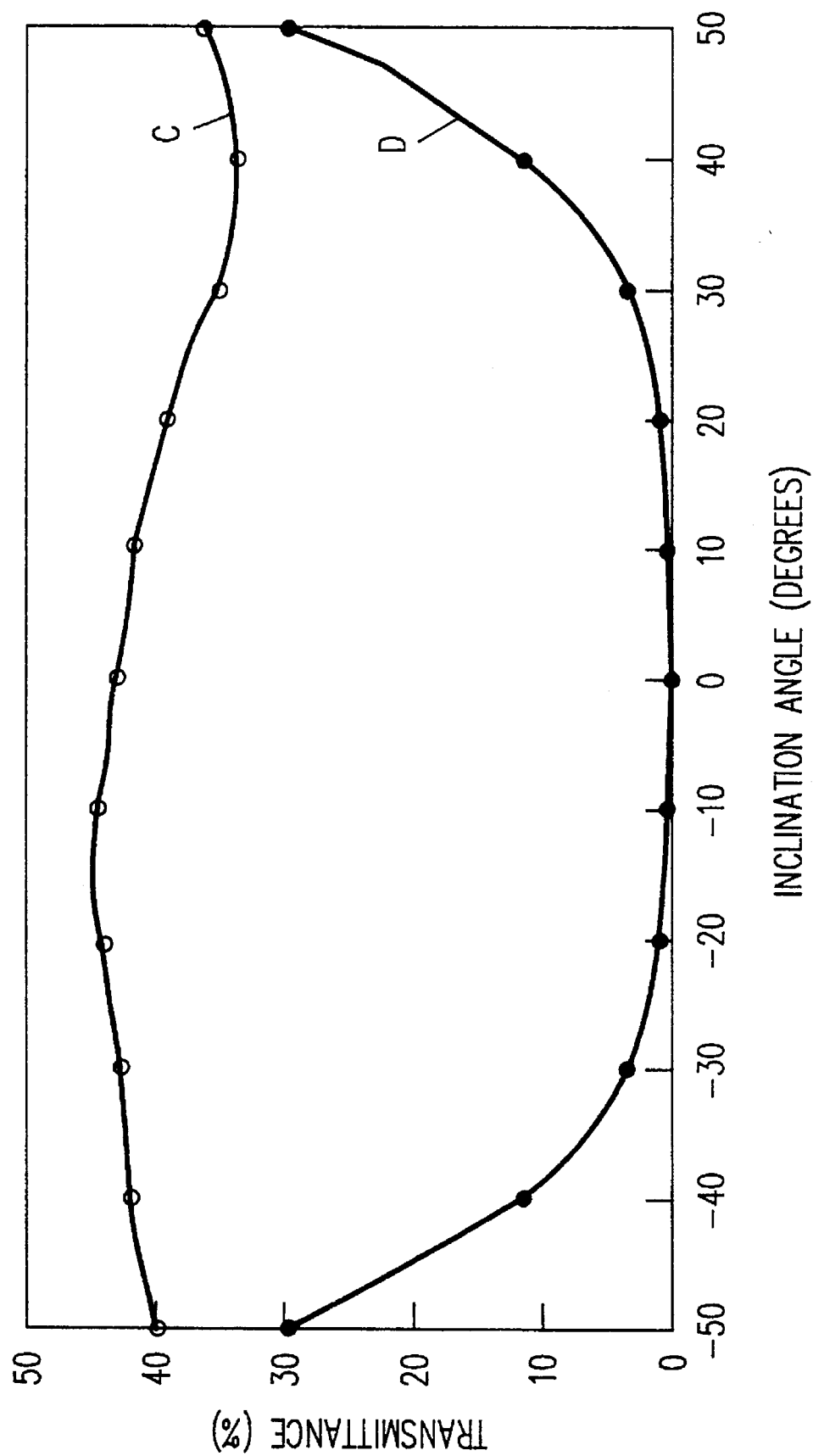
FIGS. 31–34 are respective graphic illustrations of the dependency of transmittance on the viewing angle relative to a display element or cell according to this invention.
Figure 32:
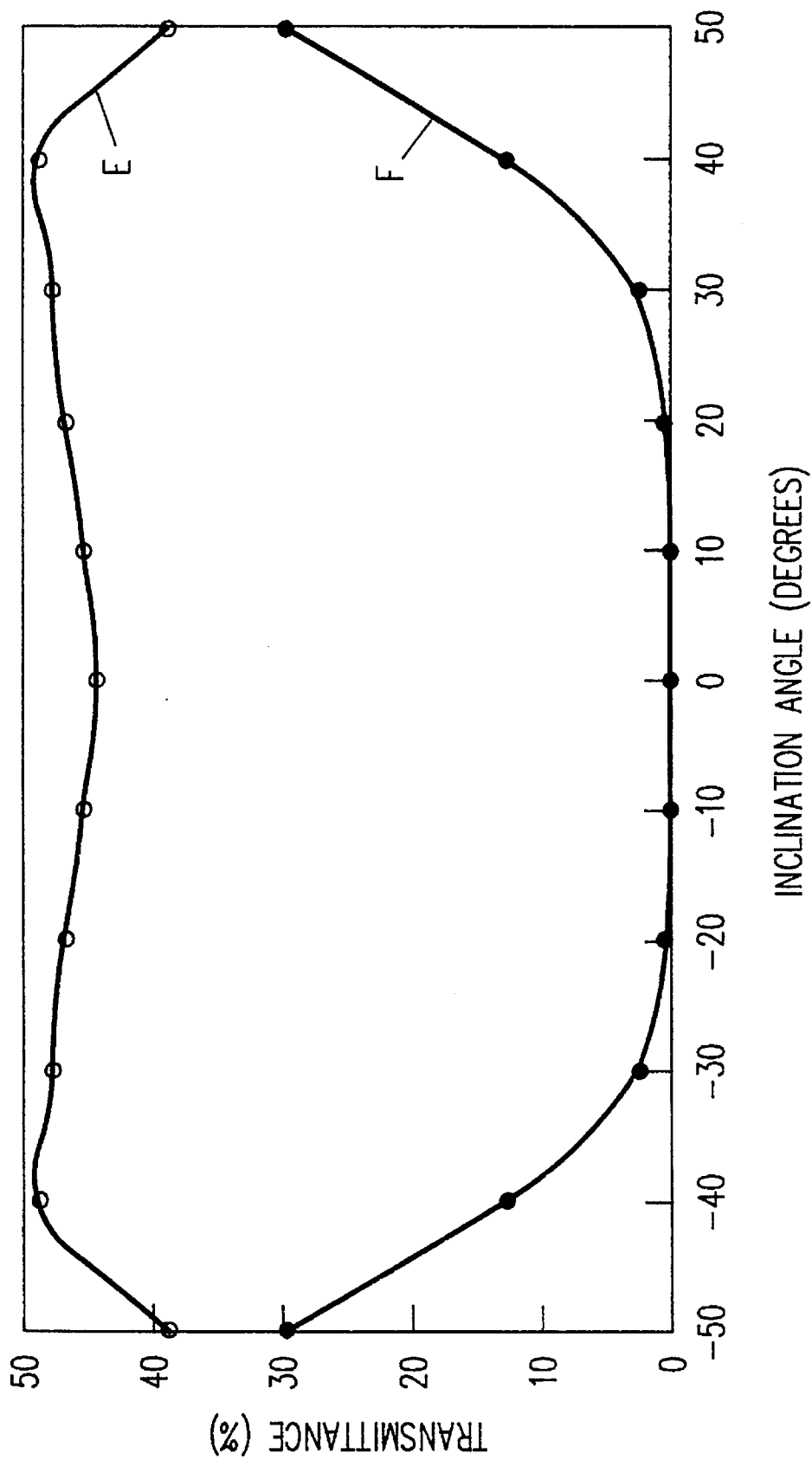
Figure 33:
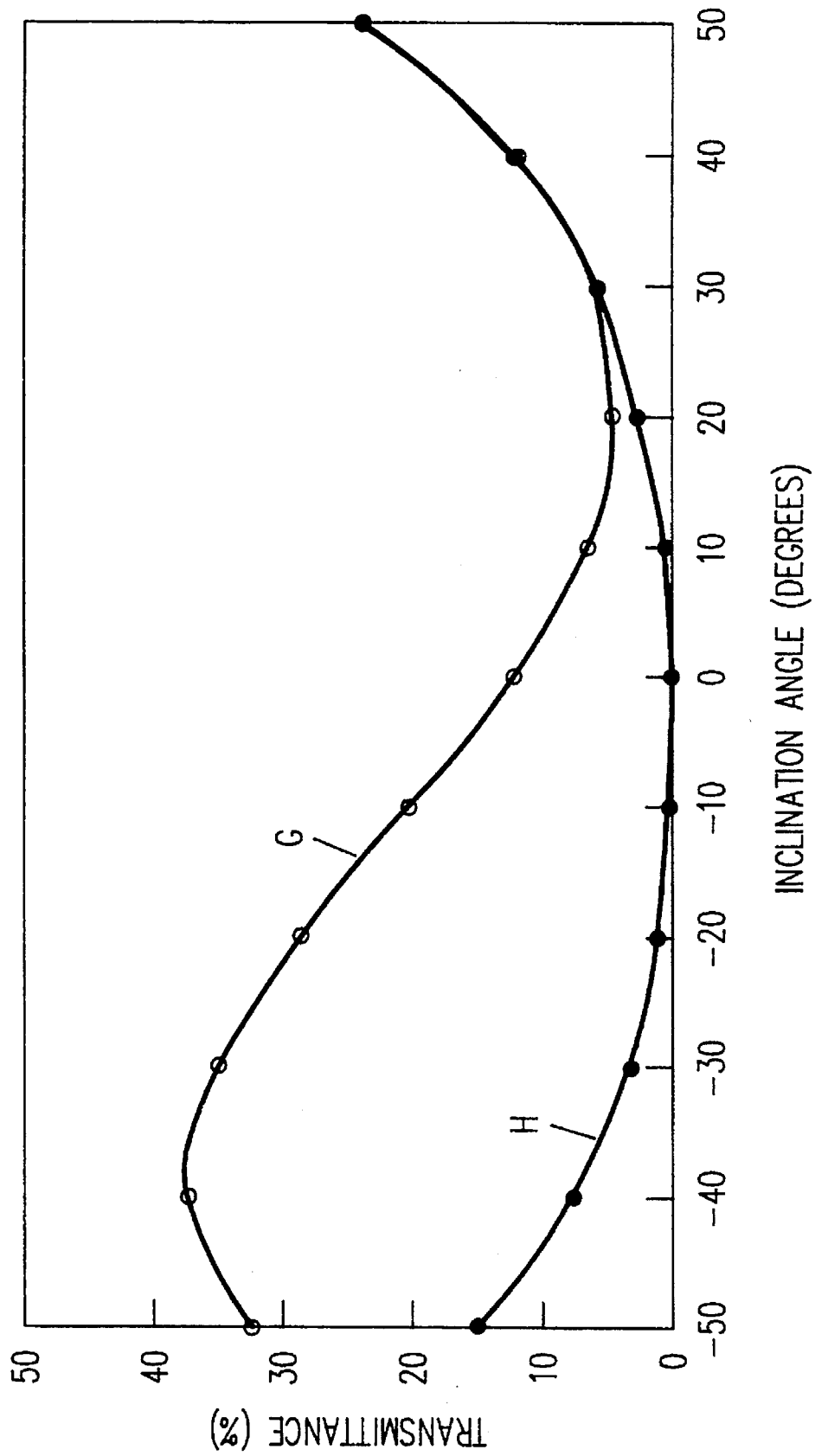
Figure 34:
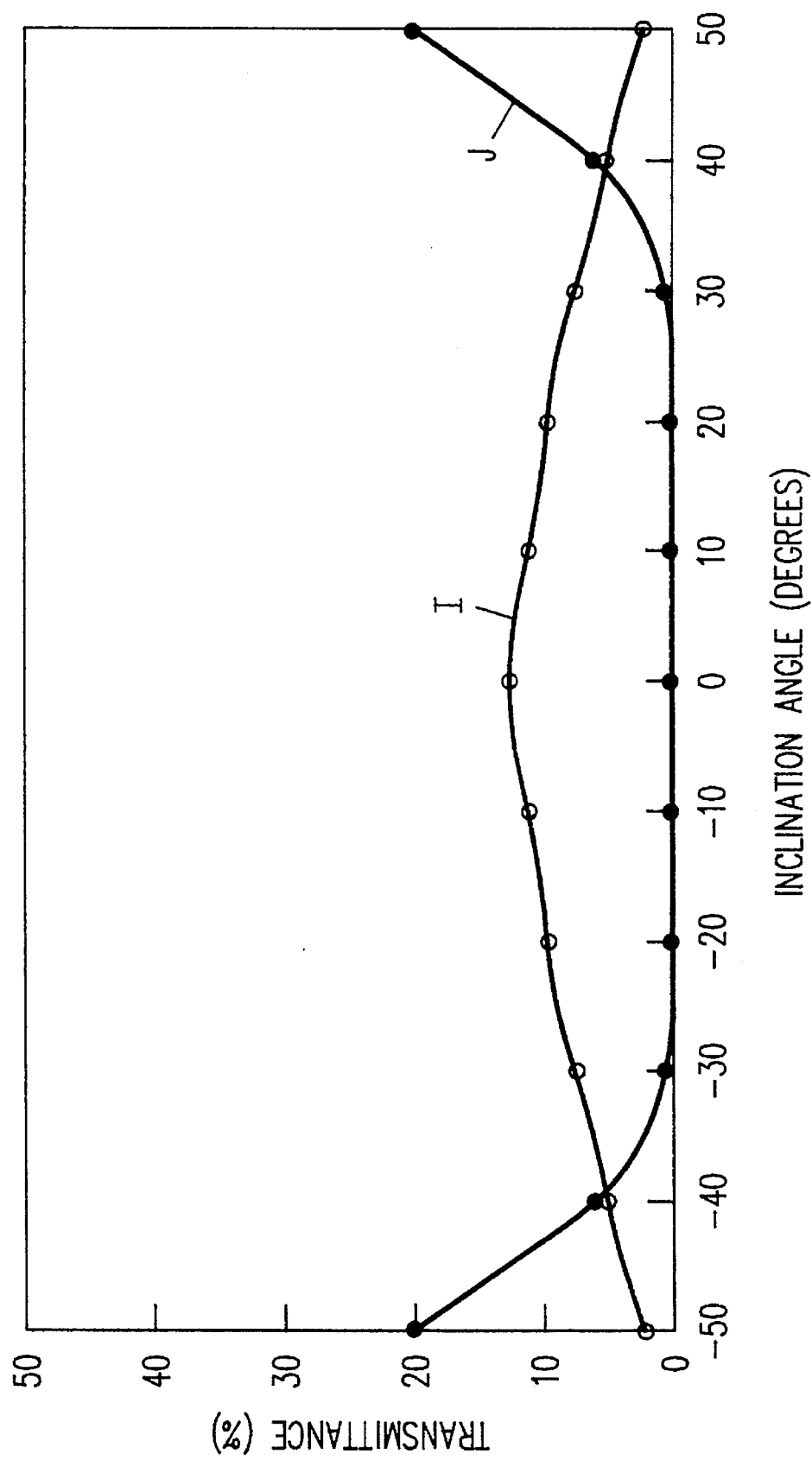

The dependency of transmittance on the viewing angle according to a display element of this invention is illustrated in FIGS. 31 and 32. FIG. 31 in curve C illustrates the transmittance when the ON condition is selected and curve D illustrates the transmittance when the OFF is selected wherein the viewing angle is inclined in the axial direction of the liquid crystal molecules at the interface from a line normal to the substrate planar surface. FIG. 32 shows similar curves E (the ON condition) and F (the OFF condition) when the viewing angle is changed to a direction perpendicular to that illustrated in FIG. 31. The change in transmittance when the ON condition is selected is small in the axial direction of the liquid crystal molecules and in the direction perpendicular to the axial direction of the liquid crystal molecules so that there is no inversion of the display in a range of ±50°. The above viewing angle characteristic was achieved in this embodiment with a pretilt angle of about 5° at the substrate interface. However, for the sake of comparison, the characteristic for a pretilt angle of 45° at the substrate interface is illustrated in FIGS. 33 and 34. In these figures, curves G and I indicate when the ON condition is selected and curves H and J indicate when the OFF condition is selected. As illustrated in FIG. 33, the contrast ratio becomes one in a first direction approximately 30° from the substrate normal line in the axial direction of the liquid crystal molecules. As illustrated in FIG. 34, in a direction perpendicular to the first direction, inversion of the display occurs at a position at approximately ±40°. Therefore, the effectiveness of the liquid crystal display element employed in this invention can also be seen from the standpoint of the dependency of transmittance on the viewing angle of the display.

Figure 1:
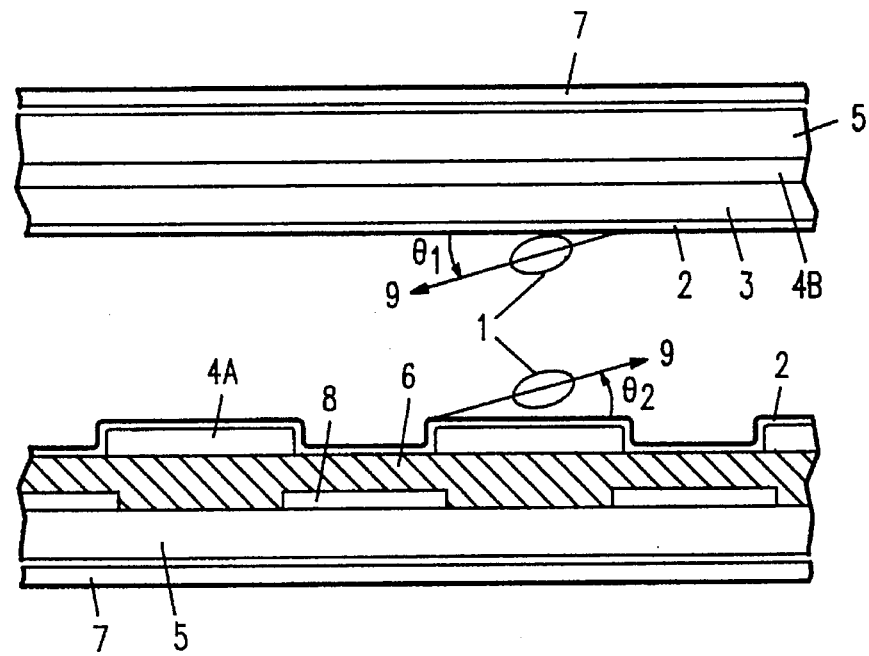
FIG. 1 is a cross sectional view of a liquid crystal display device utilized in all of the embodiments of this invention.

The invention is now explained in detail below relative to several detailed embodiments. FIG. 1 is a cross sectional view of the basic liquid crystal display device according to the embodiments of this invention. In FIG. 1, a liquid crystal element or cell is illustrated for a liquid crystal display device comprising this invention wherein substrates 5 may be comprised of glass with their outer surfaces provided with polarizing plates 7. The inner surface of lower substrate 5 includes a masking layer or regions 8 between pixel elements followed by the application of a planarizing layer 6 to provide a flat surface upon which are formed transparent ITO (Indium-Tin-Oxide) electrode regions 4A. Transparent ITO transparent electrode regions 4B are provided on the surface of upper substrate 5. Insulating film 3 is formed on electrode regions 4B. Orientation films 2 are then formed on the surfaces of electrode regions 4A and 4B and are rubbed according to a predetermined rubbing direction. The liquid crystal medium is placed within a predetermined gap or gap portion formed by means of spacers holding the respective substrate structures in a desired spatial relation. The liquid crystal molecules I at the surface interface with the substrate have pretilt angles $\theta_1$ and $\theta_2$ and are oriented in the rubbing direction.

First Embodiment

An optically active compound, including chiral components such as available from E. Merck Corp. as product No. S811, was added to a liquid crystal medium, such as available from Rodick Corp. as product No. M7018, and having a retardation of Δn- 0.1, which provides for a nematic phase at room temperature and induces a twist tp the liquid crystals having a helical pitch, p, of 3.2 μm. The cell comprising the liquid crystal device comprises polyimide alignment layers rubbed in opposing parallel directions, i.e., in 180° opposite directions, respectively on the upper and lower substrates. The substrates are separated by a gap, d, of 2.0 μm. When the above liquid crystal medium was inserted into the gap, the interface pretilt angles of the molecular directors adjacent to the upper and lower substrates were approximately 4° with opposite signs at opposite substrates. Since the relationship, p/4<d<3p/4 holds true, the orientation of the liquid crystal molecules takes on a 180° twisted state with a helical axis in a direction perpendicular to the planar extent of the substrate. The resulting element or cell structure of the liquid crystal display device for this embodiment is illustrated in FIG. 1. Two polarizing plates whose polarizations are approximately perpendicular to one other were respectively added to the outside surface of each of the substrates. Driving voltage waveforms utilized in this embodiment were applied to the formed signal and scan electrodes and the optical characteristics of the display were evaluated.

Figure 2:
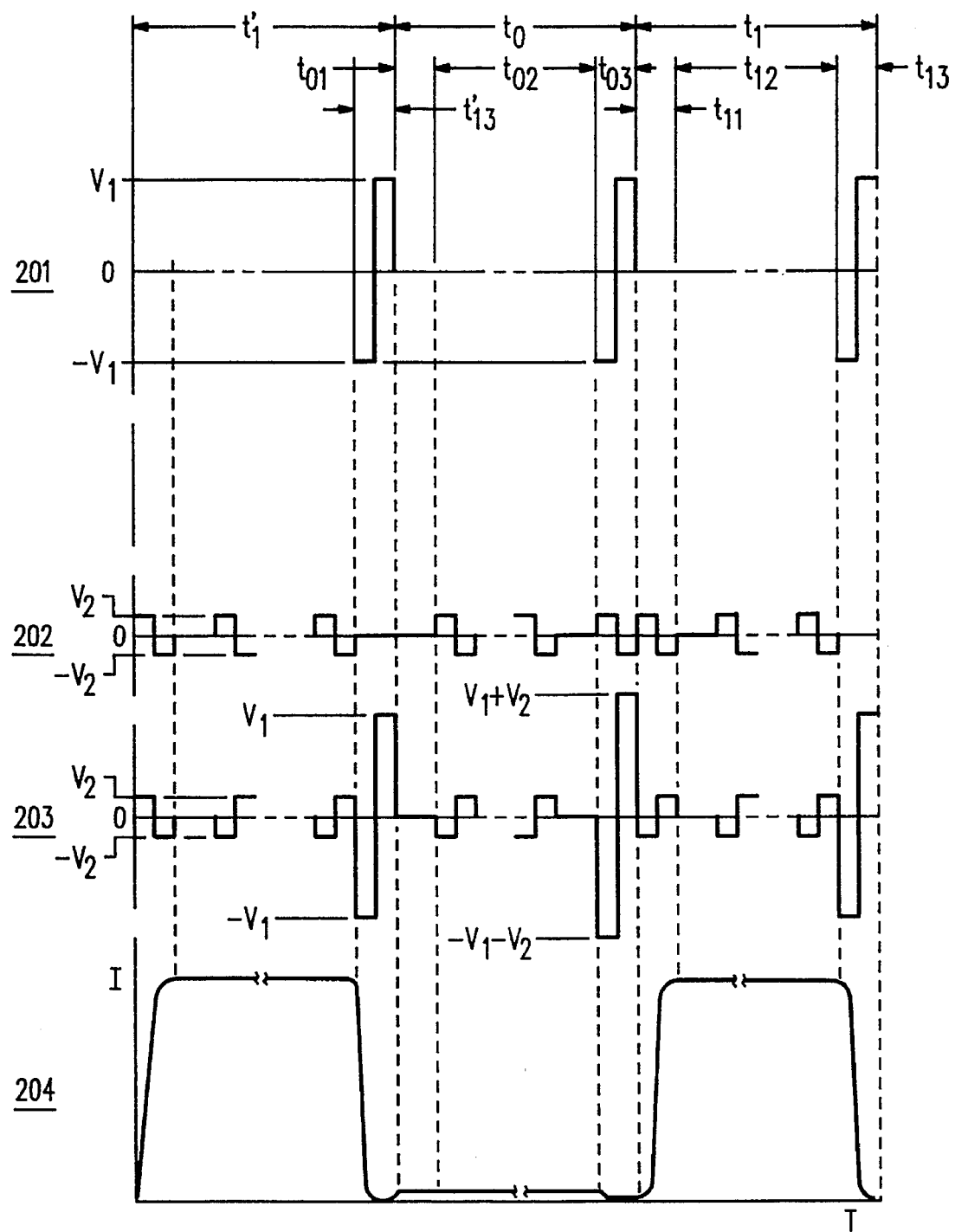
FIG. 2 includes a waveform illustrating the optical response corresponding to the applied driving voltage waveforms in connection with the first embodiment of this invention.

The driving voltage waveforms for this embodiment are illustrated in FIG. 2. In FIG. 2, the applied scan electrode waveform is shown at 201, the applied signal electrode waveform is shown at 202, and the resulting composite waveform upon concurrent application of waveforms 201 and 202 is shown at 203. The optical response characteristics are shown at 204 when the composite waveform 203 is applied to the liquid crystal display element. In FIG. 2, time period to indicates the frame status, i.e., the scan time required for one screen of data, when OFF condition, i.e., the dark state, is selected, and time periods $t_1$ and $t_{1''}$ indicate the frame status when ON condition, i.e., the bright state, is selected. Time periods $t_{01}$ and $t_{11}$ correspond to selection periods, while time periods $t_{02}$, $t_{03}$ and time periods $t_{12}$, $t_{13}$ correspond to nonselection periods. At the end of a nonselection period, a period is established in which a voltage pulse is applied, such as, $\pm(V_1+V_2)$ in $t_{03}$ or $\pm V_1$ in $t_{13}$ and $t_{13'}$, having an absolute value is greater than the threshold value of the element, to bring about Frederick's transition. In OFF selection frame to, after the $\pm(V_1+V_2)$ or $\pm V_1$ voltage pulse is applied, prior to selection period $t_{01}$, bringing about Frederick's transition, a voltage pulse whose absolute voltage value is 0 is applied to the electrodes thereby selecting the dark state in selection period $t_{01}$. In nonselection period $t_{02}$, a voltage pulse whose absolute voltage value is lower than the threshold value of the element is applied to facilitate multiplex driving. In ON selection frame $t_1$, a pulse $-V_2$, with a polarity opposite that of the pulse immediately preceding, is applied in selection period $t_{11}$ and a bright state is selected which has a metastable state different from that in the case achieved in time period $t_0$. A voltage pulse whose absolute voltage value is lower than the threshold value of the element is applied in nonselection period $t_{12}$, to facilitate multiplex driving. When an LC element according to this embodiment was operated at 30° C. and with operating voltage values $V_1$=34.0 v, $V_2$=1.7 v and a pulse width $P_w$=700 μs, the transmittance of the bright state was 44%, which is based on a transmittance of 100% when the two polarizing plates would be disposed on the same optical element as here except with their polarization axes being aligned parallel. The contrast ratio between the two states was 65.

Second Embodiment

Figure 3:
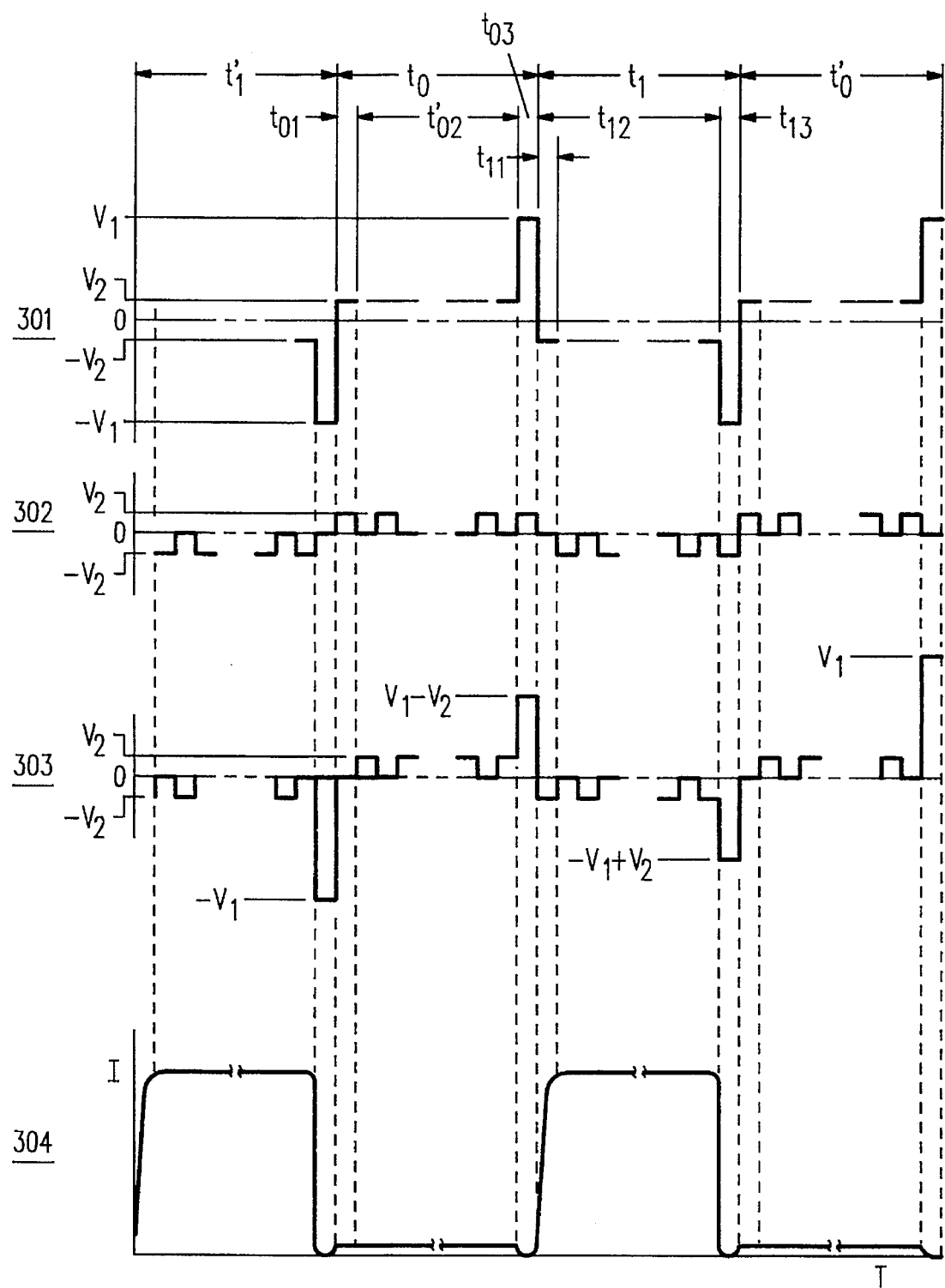
FIG. 3 includes a waveform illustrating the optical response corresponding to the applied driving voltage waveforms in connection with the second embodiment of this invention.

In this embodiment, the driving voltage waveforms shown in FIG. 3 were applied to the liquid crystal display device of the first embodiment. In FIG. 3, the applied scan electrode waveform is shown at 301, the applied signal electrode waveform is shown at 302, and the composite waveform of concurrently applied waveforms 301 and 302 is shown at 303. The optical response characteristic is shown at 304 when the composite waveform 303 is applied to the liquid crystal display element. Time periods $t_0$ and $t_{0'}$ indicate frames when an OFF condition, i.e., dark state, is selected, and time periods $t_1$ and $t_{1'}$ indicate frames when ON condition, i.e., bright state, is selected. Time periods $t_0$ and $t_1$, $t_{01}$ and $t_{11}$ correspond to selection periods and time periods $t_{02}$, $t_{03}$ and $t_{12}$, $t_{13}$ correspond to nonselection periods. A period is established at the end of nonselection periods in which voltage pulses, such as, $(V_1-V_2)$ in time period $t_{03}$ or $(-V_1+V_2)$ in time period $t_{13}$, having absolute voltage values in excess of the threshold value of the element, are applied to bring about Frederick's transition. In OFF selection frame $t_0$, a pulse whose voltage absolute voltage value is 0 is applied in selection period $t_{01}$ and the dark state is then selected after a voltage pulse, shown as $-V_1$ in FIG. 3, whose absolute voltage value is greater than the threshold value of the element is applied immediately prior to selection period $t_{01}$ bringing about Frederick's transition. In nonselection period $t_{02}$, a pulse whose absolute voltage value is lower than the threshold value of the element is applied to facilitate multiplex driving. During ON selection frame $t_1$, a pulse, i.e., $-V_2$, whose polarity is opposite that of the voltage pulse applied immediately preceding it is applied in selection period $t_{11}$ whereby the bright state is selected. In nonselection period $t_{12}$, a pulse whose absolute voltage value is lower than the threshold value of the element is applied to facilitate multiplex driving. When a liquid crystal display having a LC element the same as that in the first embodiment was operated at 30° C. with applied voltages $V_1=36.0$ v, $V_2=1.8$ v and a pulse width $P_w=1.0$ ms, the transmittance of the bright state was 44% and the contrast ratio between the two states was 68. Also, the polarity of the applied waveform is temporarily inverted in two adjacent frames in this embodiment so that an excessive DC component is not applied on the element.

Third Embodiment

Figure 4:
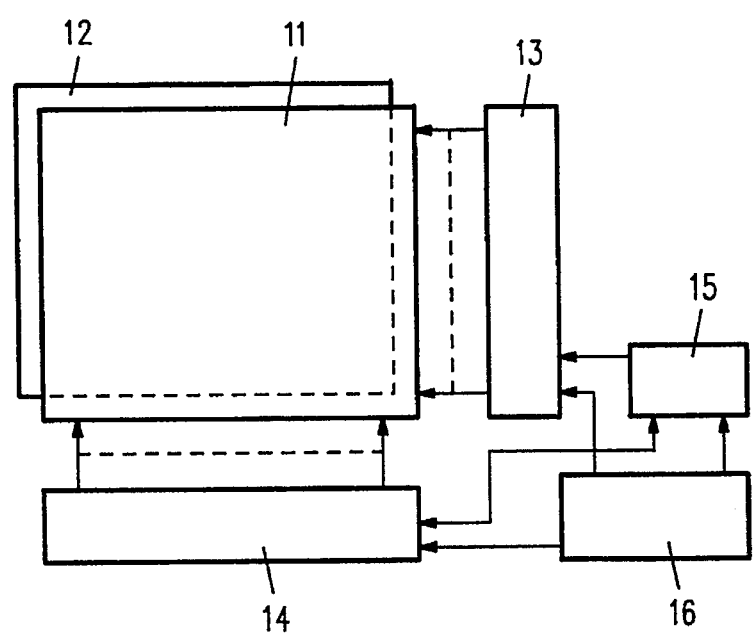
FIG. 4 is a diagrammatic layout of the circuit driving system for the liquid crystal display device shown in FIG. 1.

An optically active compound, including chiral components such as available from E. Merck Corp. as product No. S811, was added to the liquid crystal medium, such as available from E. Merck Corp. as product No. ZLI-1557, providing a nematic phase at room temperature and inducing a twist to the liquid crystals with a helical pitch, p, of 3.5 µm. The cell including the liquid crystal device comprises polyimide alignment layers formed respectively on upper and lower substrates beneath which are respectively disposed a scan electrode group and signal electrode group formed of ITO. The alignment layers on the upper and lower substrates are rubbed in opposite parallel directions (180°) which were thereafter positioned together in spatial relation separated by a gap, d, of 1.8 µm. When the prepared liquid crystal medium was introduced into the formed gap, the interface pretilt angles of the molecular directors of the molecules adjacent to the upper and lower substrates were approximately 4° with opposite signs. Since the relationship, $p/4<d<3p/4$, holds true, the orientation of the liquid crystal molecules took on a 180° twisted state with a helical axis in a direction perpendicular to the planar extent of the substrate. The element structure of this liquid crystal display device is the same as shown in FIG. 1. The resulting LC element of this configuration generates two metastable states approximating a 0° uniform state and a 360° twisted state, depending on the applied driving voltage waveforms. Two polarizing plates were applied to the structure. The fabricated liquid crystal display device according to this embodiment was provided with the circuit configuration shown in FIG. 4. In FIG. 4, liquid crystal panel 11 comprises backlight 12 for illumination, and operational driving circuits 13 and 14 including conventional shift registers, latch circuits and appropriate logic circuitry for application of a simple matrix driving system for applying, respectively, voltages on the scan electrode group and on the signal electrode group of liquid crystal panel 11. Signal generator circuit 15 and sequential line scanning circuit 16 comprise conventional controllers including memory as known in the art.

Figure 5:
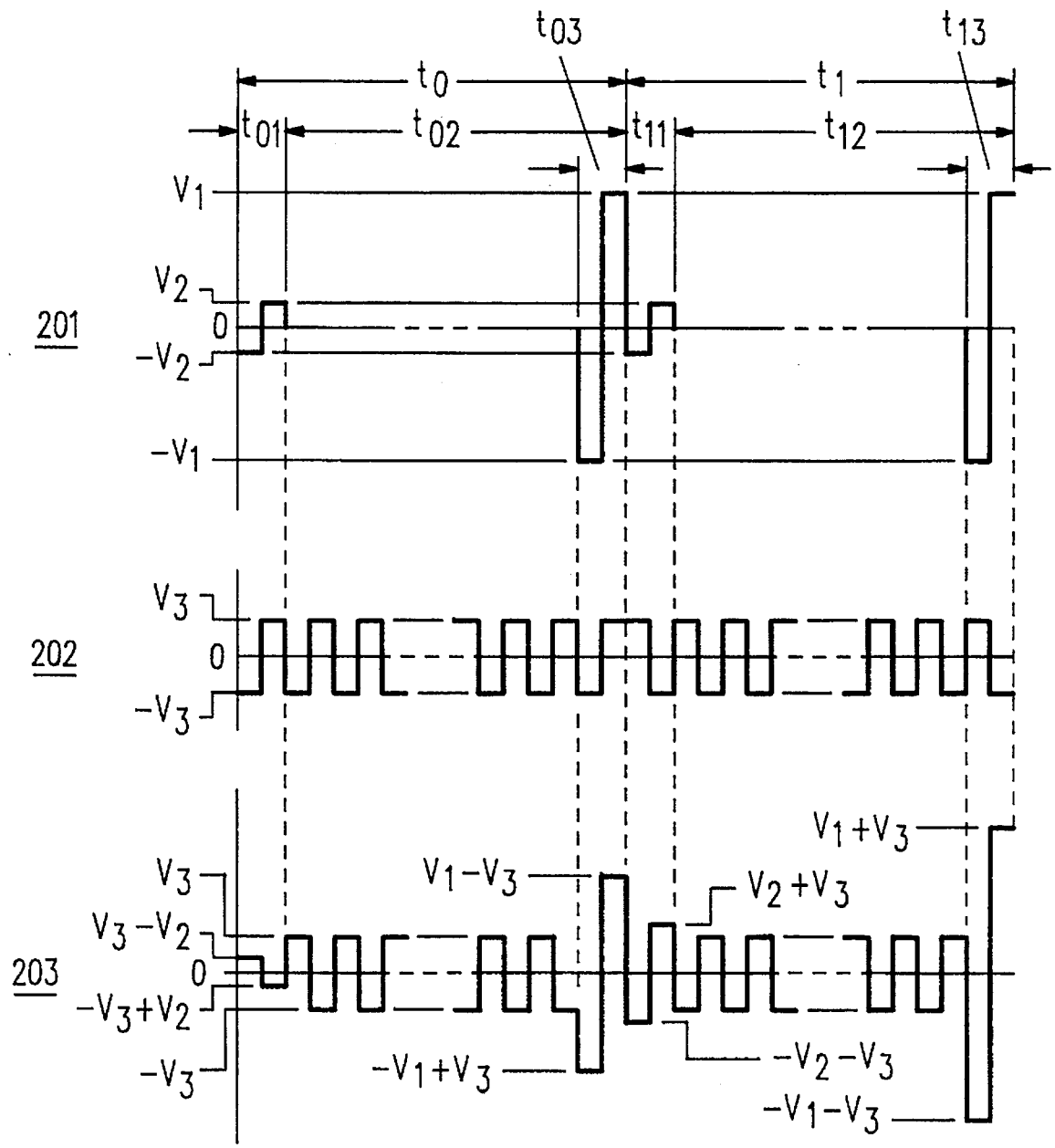
FIG. 5 is an illustration of the driving voltage waveforms in connection with the third embodiment of this invention.

The driving voltage waveforms utilized in this third embodiment are shown in FIG. 5. In FIG. 5, applied scan electrode waveform is shown at 201, the applied signal electrode waveform is shown at 202, and the composite waveform of applied waveforms 201 and 202 is shown at 203. Frames during time periods $t_0$ and $t_1$ indicate respectively frames in which a 360° twisted state, i.e., an OFF condition, and a uniform state, i.e., an ON condition, are selected. Time periods $t_{01}$ and $t_{11}$ correspond to selection periods, while time periods $t_{02}$, $t_{03}$ and $t_{12}$, $t_{13}$ correspond to nonselection periods. At the end of the nonselection periods, a period to bring about Frederick's transition is established in which a voltage pulse, such as, $\pm(V_1-V_3)$ in time period $t_{03}$ or $\pm(V_1+V_3)$ in time period $t_{13}$, is applied whose absolute voltage value is greater than the threshold value of a LC element of panel 11. In OFF selection frame $t_0$, after a voltage pulse (not shown) whose absolute voltage value is greater than the threshold value of the LC element is applied prior to selection period $t_{01}$, a pulse with the same polarity and whose voltage absolute value is $|V_3-V_2|$ is applied for selection of the OFF state in selection period $t_{01}$. In nonselection period $t_{02}$, a pulse whose absolute voltage value is lower than the threshold value of the LC element is applied to facilitate multiplex driving. In ON selection frame $t_1$, a pulse comprising $(-V_2-V_3)$, having a polarity opposite to that of the immediately preceding pulse is applied in selection period $t_{11}$ thereby selecting the ON state. Then, a pulse whose absolute voltage value is lower than the threshold value of the element is applied in nonselection period $t_{12}$ to facilitate multiplex driving. When an LC element according to this embodiment was operated at 30° C. and with applied voltages of $V_1=30.0$ v, $V_2=1.0$ v, $V_3=1.5$ v, a pulse width $P_w=250$ µs, and a duty ratio of 1/400 ($t_{01}=t_{11}=500$ µs, $t_0=t_1=400\times500$ µs) so that selective switching of the LC element between the above described states was effectively achieved.

Fourth Embodiment

Figure 6:
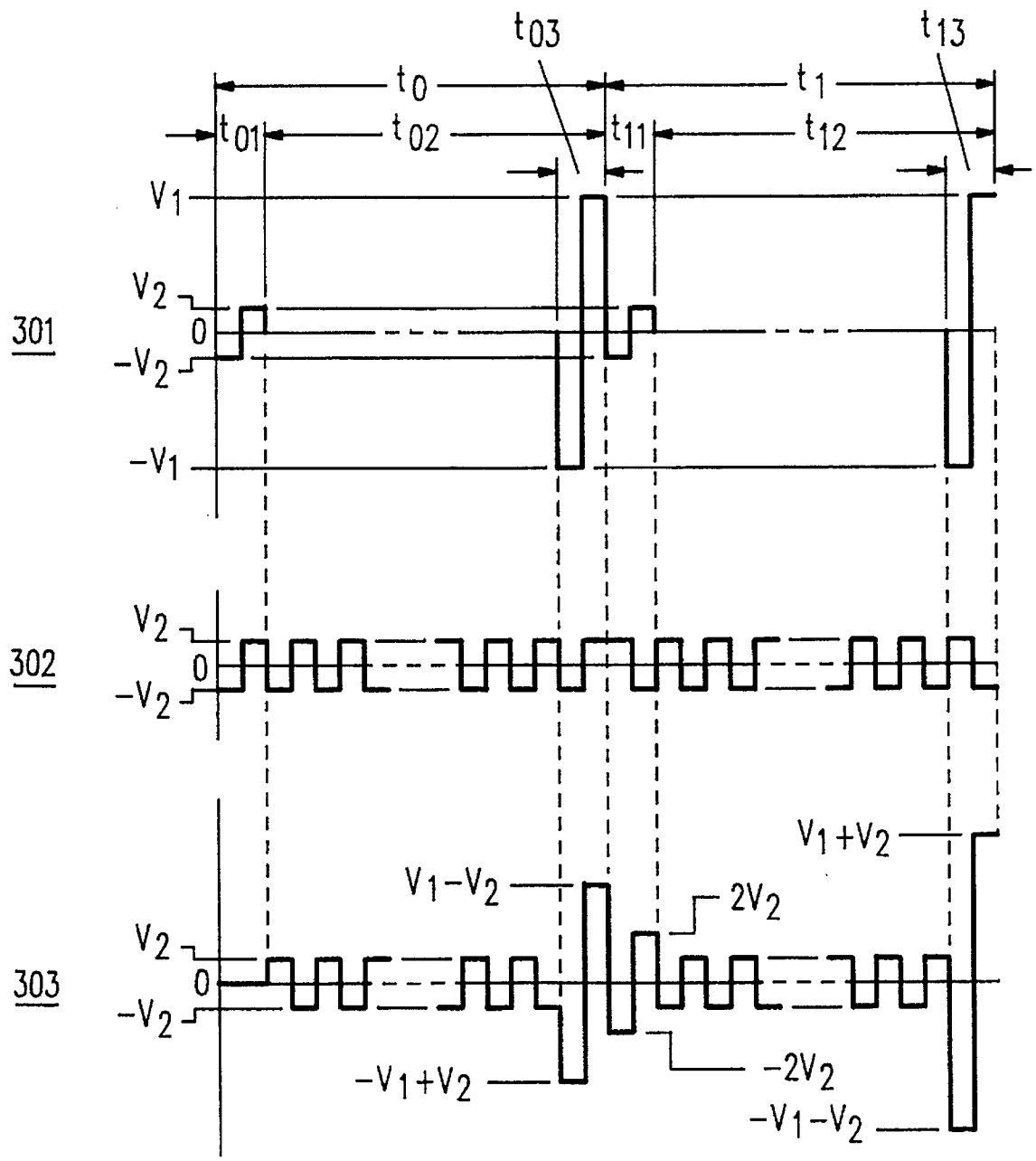
FIG. 6 is an illustration of the driving voltage waveforms in connection with the fourth embodiment of this invention.

Other driving voltage waveforms applied in the liquid crystal display device of the third embodiment are illustrated in FIG. 6. The applied scan electrode waveform is shown at 301, the applied signal electrode waveform is shown at 302, and the composite waveform of applied waveforms 301 and 302 is shown at 303. Frames during time periods $t_0$ and $t_1$ indicate frames in which a 360° twisted state, i.e., OFF condition, and the uniform state, i.e., ON condition, are respectively selected. The frames during the time periods $t_{01}$ and $t_{11}$ correspond to selection periods, and time periods $t_{02}$, $t_{03}$ and $t_{12}$, $t_{13}$ correspond to nonselection periods. At the end of the nonselection periods, a period is established in which a voltage pulse such as $\pm(V_1-V_2)$ in $t_{03}$ and $\pm(V_1\pm V_2)$ in $t_{13}$, having an absolute value greater than the threshold value of the element, is applied to bring about Frederick's transition. In OFF selection frame $t_0$, after a voltage pulse (not shown)

whose absolute value is greater than the threshold value of the element is applied immediately prior to selection period $t_{01}$ bringing on Frederick's transition, a pulse with the same polarity and whose voltage absolute value is 0 is applied bring about selection of the OFF state in selection period $t_{01}$. In nonselection period $t_{02}$, a pulse whose voltage absolute value is lower than the threshold value of the element is applied to facilitate multiplex driving. In ON selection frame $t_1$, a pulse ($-V_2$), with a polarity opposite to that of the pulse applied immediately preceding it, is applied in selection period $t_{11}$ bringing about selection of ON state. A pulse whose voltage absolute value is lower than the threshold value of the element is applied in nonselection period $t_{12}$, to facilitate multiplex driving. The driving voltage waveforms of this embodiment are equivalent to those in the third embodiment where $V_2=V_3$. When a LC element according to this embodiment was operated at 30° C. and with $V_1=30.0$ v, $V_2=1.0$ v, $V_3=1.0$ v, pulse width $P_w=250$ μs, and a duty ratio of 1/400 ($t_{01}=t_{11}=500$ μs, $t_0=t_1=400\times500$ μs), selective switching of the element was effectively achieved.

Figure 7:
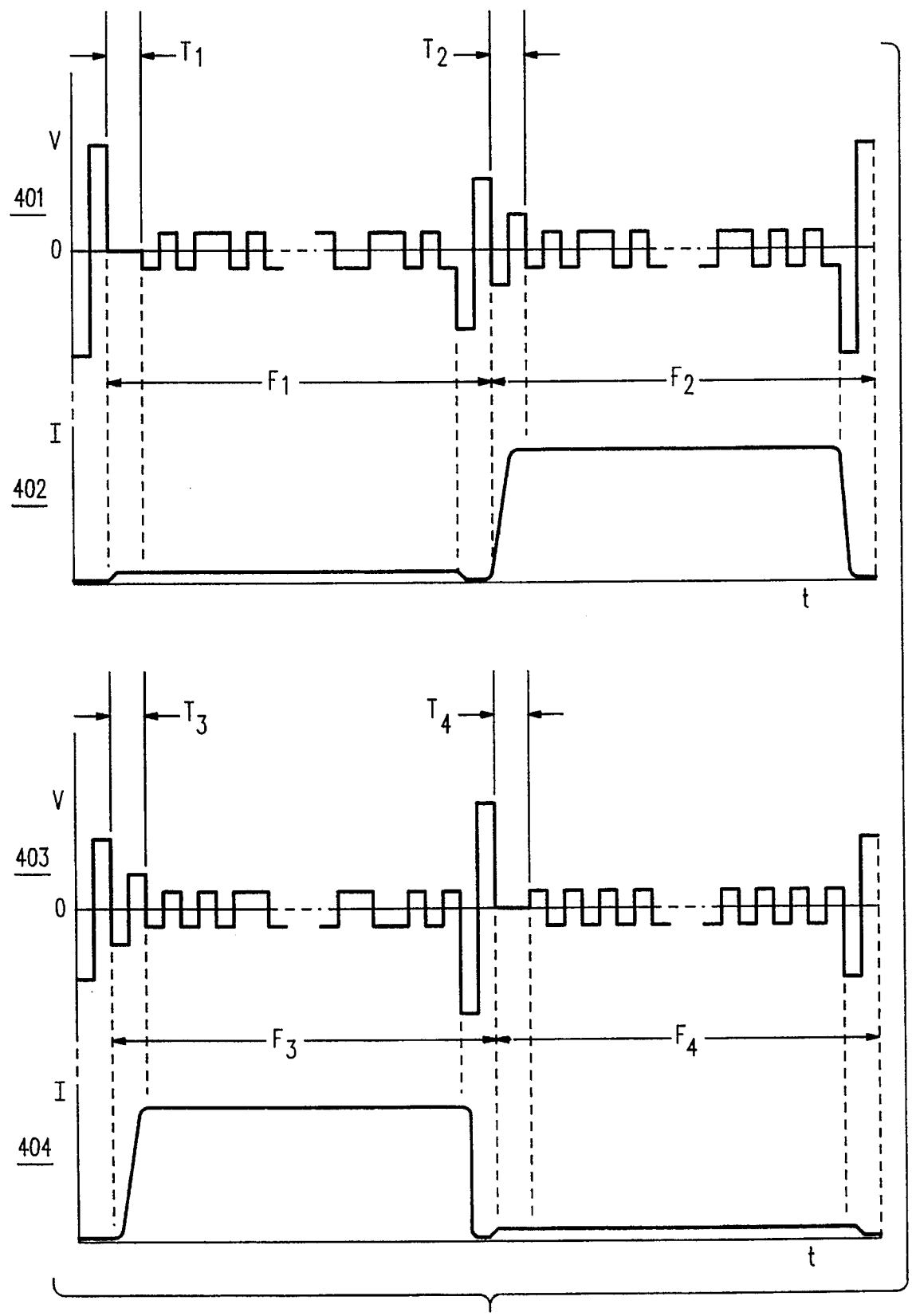
FIG. 7 is an illustration of the driving voltage waveforms and the corresponding optical response according to the fourth embodiment of this invention.

In FIG. 7, the optical response of an addressed picture cell of the device is indicated at 402, 404 which respectively corresponds to the composite driving waveforms 401, 403 applied to the liquid crystal medium when operated with polarizing plates, where a 360° twisted state is the dark state and the uniform state is the light transmissive state. In FIG. 7, $F_1$ and $F_4$ indicate OFF selection frames, $F_2$ and $F_3$ indicate ON selection frames, and $T_1$, $T_2$, $T_3$ and $T_4$ are respective selection periods. The light transmittance in the bright state with this optical arrangement was 72%, and the contrast ratio between the two states was 68.

Figure 8:
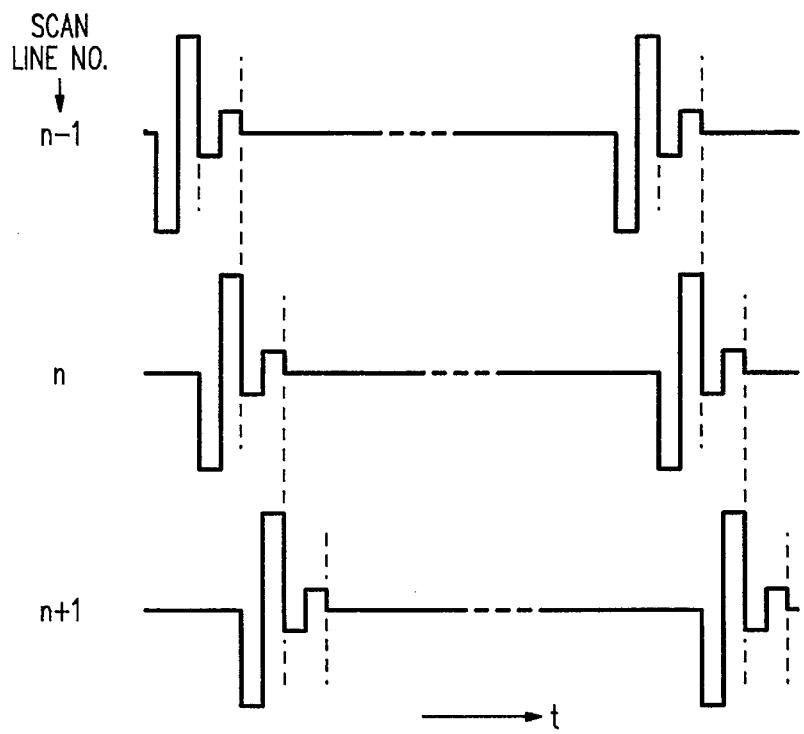
FIG. 8 is an illustration of the timing of the applied voltage waveforms to the scan electrodes according to the fourth embodiment of this invention.

FIG. 8 shows the sequential timing of waveforms applied on adjacently selected scan electrodes, (n−1, n, n+1), and having two pulse phase difference, when the driving waveforms of both the third embodiment and this fourth embodiment are applied to an orthogonal matrix comprising plural signal and scan electrodes and this sequential line scanning approach is utilized in the driving method.

Fifth Embodiment

Figure 9:
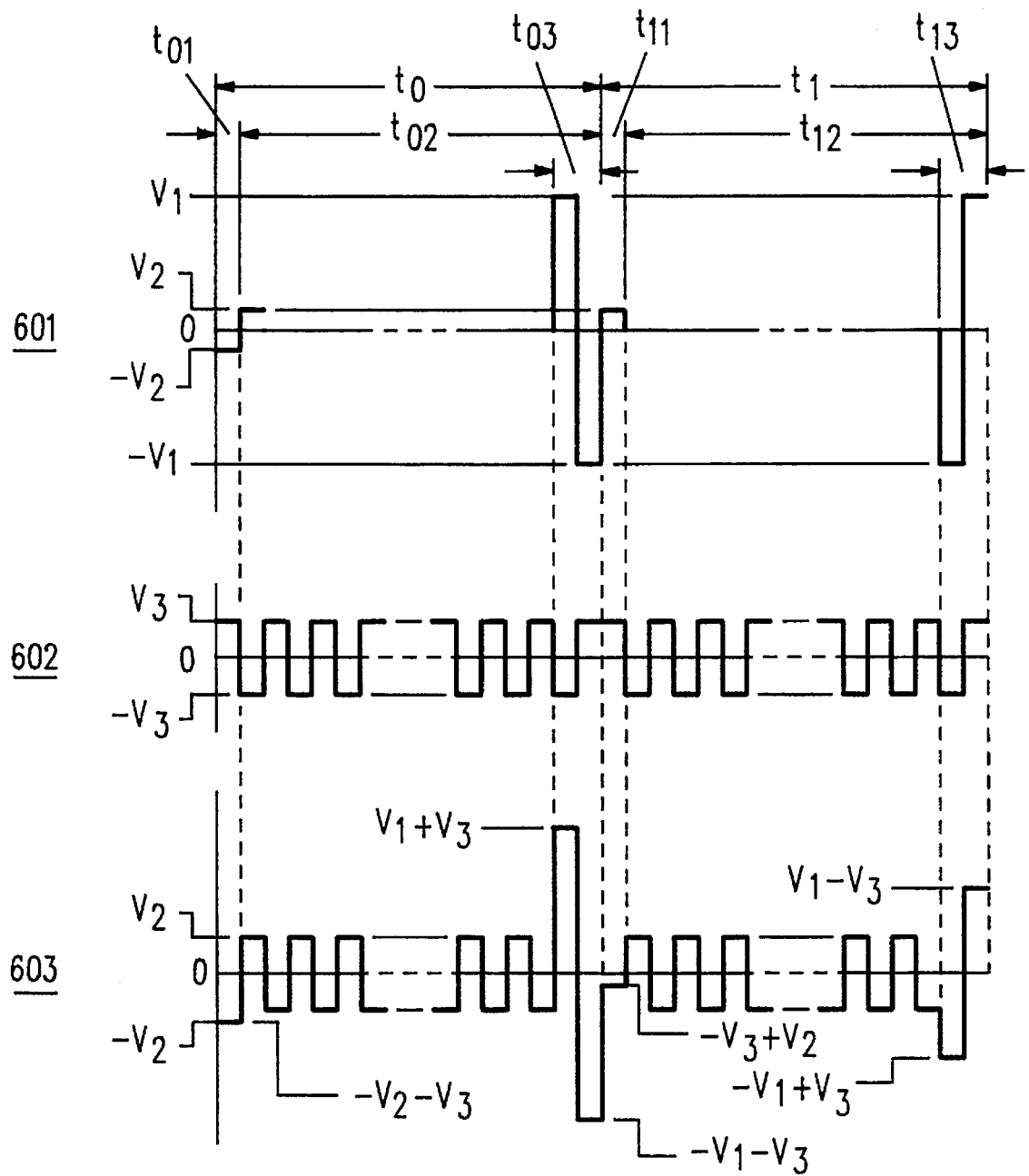
FIG. 9 is an illustration of the driving voltage waveforms in connection with the fifth embodiment of this invention.

FIG. 9 illustrates further driving voltage waveforms applied to the liquid crystal display device of the third embodiment. In FIG. 9, the applied scan electrode waveform is shown at 601, the applied signal electrode waveform is shown at 602, and the composite waveform of applied waveforms 601 and 602 is shown at 603. The occurrence of frames in time periods $t_0$ and $t_1$ indicate frames (scanning time for one display screen) respectively in which a uniform state, i.e., ON condition, and a 360° twisted state, i.e., OFF condition, are selected. The occurrence of frames in time periods $t_{01}$ and $t_{11}$ correspond to selected periods, and time periods $t_{02}$, $t_{03}$ and $t_{12}$, $t_{13}$ correspond to nonselection periods. At the end of the nonselection period, a period is established in which a voltage pulse, such as, $\pm(V_1+V_3)$ in $t_{03}$ and $+(V_1-V_3)$ in $t_{13}$, having an absolute value greater than the threshold value of the element is applied to bring about Frederick's transition. In ON selection frame $t_0$, after a voltage pulse (not shown) whose absolute value is greater than the threshold value of the element is applied immediately prior to selection period $t_{01}$ bring about Frederick's transition, a pulse with opposite polarity and whose voltage absolute value is $|V_3+V_2|$ is applied bringing about selection of the ON state in selection period $t_{01}$. In nonselection period $t_{02}$, a pulse whose voltage absolute value is lower than the threshold value of the element is applied to facilitate multiplex driving. In OFF selection frame $t_1$, a pulse ($-V_3+V_2$), with the same polarity as that of the pulse applied immediately preceding it, is applied in selection period $t_{11}$ bring about the selection of the OFF state. A pulse whose voltage absolute value is lower than the threshold value of the element is applied in nonselection period $t_{12}$ to facilitate multiplex driving. When a LC element according to this embodiment was operated at 30° C. and with $V_1=30.0$ v, $V_2=1.0$ v, $V_3=1.5$ v, pulse width $P_w=400$ μs, and a duty ratio of 1/400 ($t_{01}=t_{11}=400$ μs, $t_0=t_1=400\times400$ μs), selective switching of the element was achieved. Also, the polarity of the applied waveform is inverted in two contemporaneous, adjacent frames in this embodiment so that an excessive DC component is not applied on the LC element.

Sixth Embodiment

Figure 10:
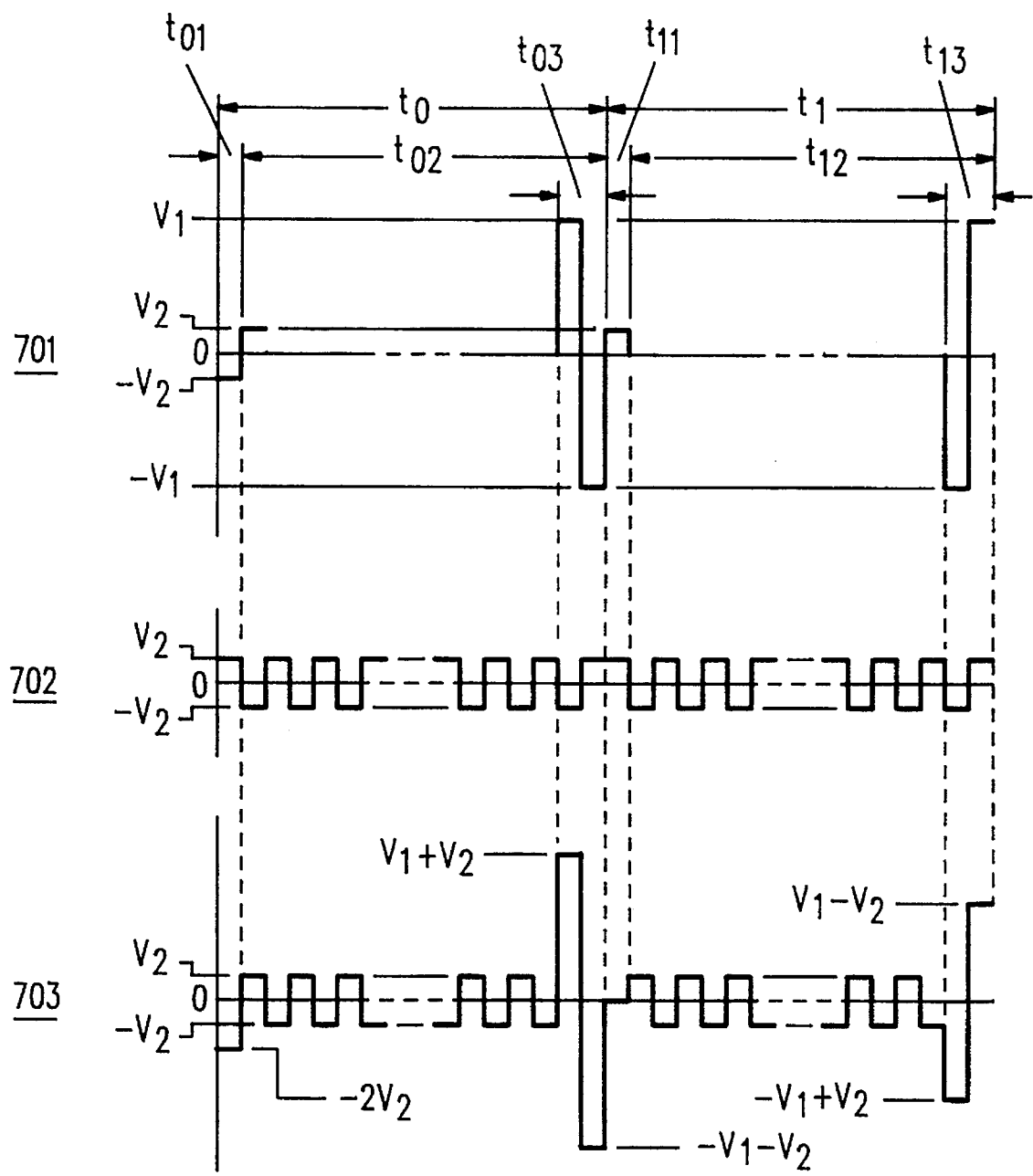
FIG. 10 is an illustration of the driving voltage waveforms in connection with the sixth embodiment of this invention.

FIG. 10 illustrates still further driving voltage waveforms applied to the liquid crystal display device of the third embodiment. In FIG. 10, the applied scan electrode waveform is shown at 701, the applied signal electrode waveform is shown at 702, and the composite waveform of applied waveforms 701 and 702 is shown at 703. The frames during time periods $t_0$ and $t_1$ indicate frames in which a uniform state, i.e., ON condition, and a 360° twisted state, i.e., OFF condition, are respectively selected. Time periods $t_{01}$ and $t_{11}$ correspond to selection periods, and $t_{02}$, $t_{03}$ and $t_{12}$, $t_{13}$ correspond to nonselection periods. At the end of the nonselection periods, a period is established in which a voltage pulse, such as, $\pm(V_1+V_2)$ in $t_{03}$ and $\pm(V_1-V_2)$ in $t_{13}$, having an absolute value greater than the threshold value of the element, is applied to bring about Frederick's transition. In ON selection frame $t_0$, after a voltage pulse (not shown) whose absolute value is greater than the threshold value of the element is applied immediately prior to selection period $t_{01}$ to bring on Frederick's transition, a voltage pulse ($-2V_2$), with a polarity opposite to that of the pulse applied immediately preceding it, is applied bringing about selection of the ON state in selection period $t_{01}$. In nonselection period $t_{02}$, a pulse whose voltage absolute value is lower than the threshold value of the element is applied to facilitate multiplex driving. In OFF selection frame $t_1$, a pulse whose voltage absolute value is 0 is applied in selection period $t_{11}$ bring about selection of the ON state. A pulse whose voltage absolute value is lower than the threshold value of the element is applied in nonselection period $t_{12}$ to facilitate multiplex driving. The driving waveforms of this embodiment are equivalent to those in the third embodiment where $V_2=V_3$. When the element was operated at 30° C. and with $V_1=30.0$ v, $V_2=1.0$ v, pulse width $P_w=400$ μs, and a duty ratio of 1/400 ($t_{01}=t_{11}=400$ μs, $t_0=t_1=400\times400$ μs), selective switching of the element was easily achieved.

Figure 11:
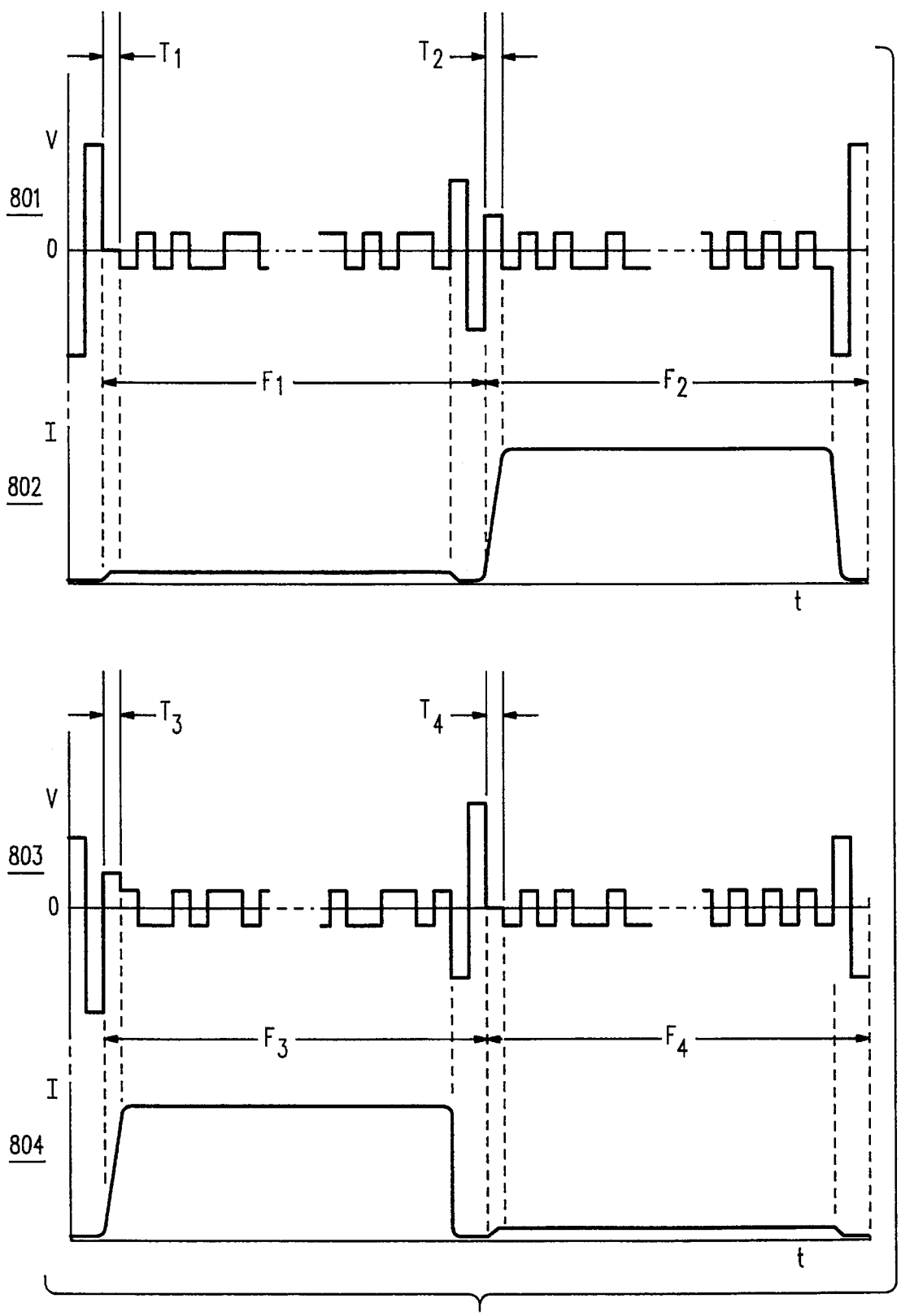
FIG. 11 is an illustration of the driving voltage waveforms and the corresponding optical response according to the sixth embodiment of this invention.

In FIG. 11, the optical response 802, 804 of an addressed picture cell of the device corresponding to the composite driving waveforms 801, 803 applied to the liquid crystal medium is shown when operated with polarizing plates wherein a 360° twisted state is the dark state and the uniform state is the light transmissive state. In FIG. 11, $F_1$ and $F_4$ indicate OFF selection frames, $F_2$ and $F_3$ indicate ON selection frames, and $T_1$, $T_2$, $T_3$ and $T_4$ are respective selection periods. The light transmittance in the bright state with this optical arrangement was 75%, and the contrast ratio between the two states was 66.

Figure 12:
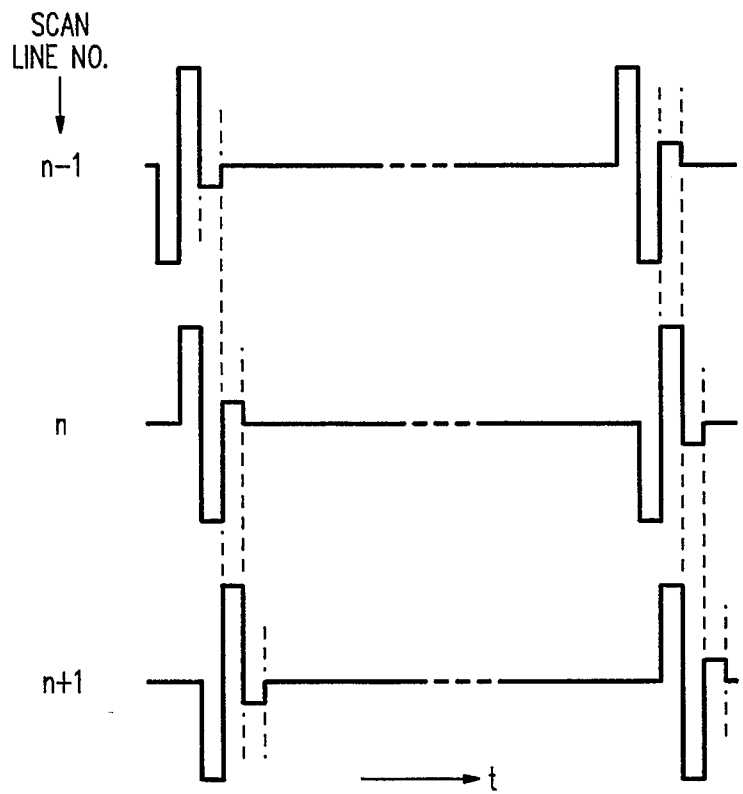
FIG. 12 is an illustration of the timing of the applied voltage waveforms to the scan electrodes according to the sixth embodiment of this invention.

FIG. 12 shows the sequential timing of waveforms applied on adjacently selected scan electrodes, (n−1, n, n+1), having a single pulse phase difference (compared with FIG. 8), when the driving waveforms of both the fifth embodiment and this sixth embodiment are applied to an orthogonal matrix comprising plural signal and scan electrodes, and this sequential line scanning approach is utilized in the applied driving method. Also, the polarity of the applied waveform is inverted in two contemporaneous, adjacent frames in this embodiment so that an excessive DC component is not applied on the LC element.

Seventh Embodiment

An optically active compound, including chiral components such as from E. Merck Corp. as product No. S811, was added to a liquid crystal medium, such as from E. Merck Corp. as product No. ZLI-1557, providing a nematic phase at room temperature and inducing a twist to the liquid crystals adjustable to a helical pitch, p, of 3.5 μm. The cell including the liquid crystal device comprises polyimide alignment layers formed respectively on upper and lower substrates beneath which are respectively disposed a scan electrode group and signal electrode group formed of ITO. The alignment layers on the upper and lower substrates are rubbed in opposite parallel directions (180°) which were thereafter positioned together in spatial relation separated by a gap, d, of 1.8 μm. When the above liquid crystal medium was introduce into the formed gap, the interface pretilt angles of the molecular directors of LC molecules adjacent to the upper and lower substrates were approximately 5° with opposite signs. Since the relationship, $p/4<d<3p/4$, holds true, the orientation of the liquid crystal molecules took on a 180° twisted state with a helical axis perpendicular to the planar extent of the substrate. The element or cell structure of this liquid crystal display element is the same as shown in FIG. 1. The resulting LC element of this configuration generates two metastable states approximating a 0° uniform or untwisted state and a 360° twisted state, depending on the applied driving voltage waveforms. Two polarizing plates were applied to the respective substrate outside surfaces. The fabricated liquid crystal display device according to this embodiment utilized the circuit configuration shown in FIG. 4. In the explanation below, the threshold voltages to bring about Frederick's transition in the initial state, which is a twist angle of 180°, approximately 0° in a uniform state and approximately 360° in a twisted state, are indicated, respectively, as $V_{th}$ (180°), $V_{th}$ (0°) and $V_{th}$ (360°). These values are collectively referred to as $V_{th}$. Also, the voltage critical value when selecting one of the two metastable states according to the magnitude of the rms value of the voltage pulse group applied immediately after bringing about Frederick's transition is indicated as $V_c$.

Figure 13:
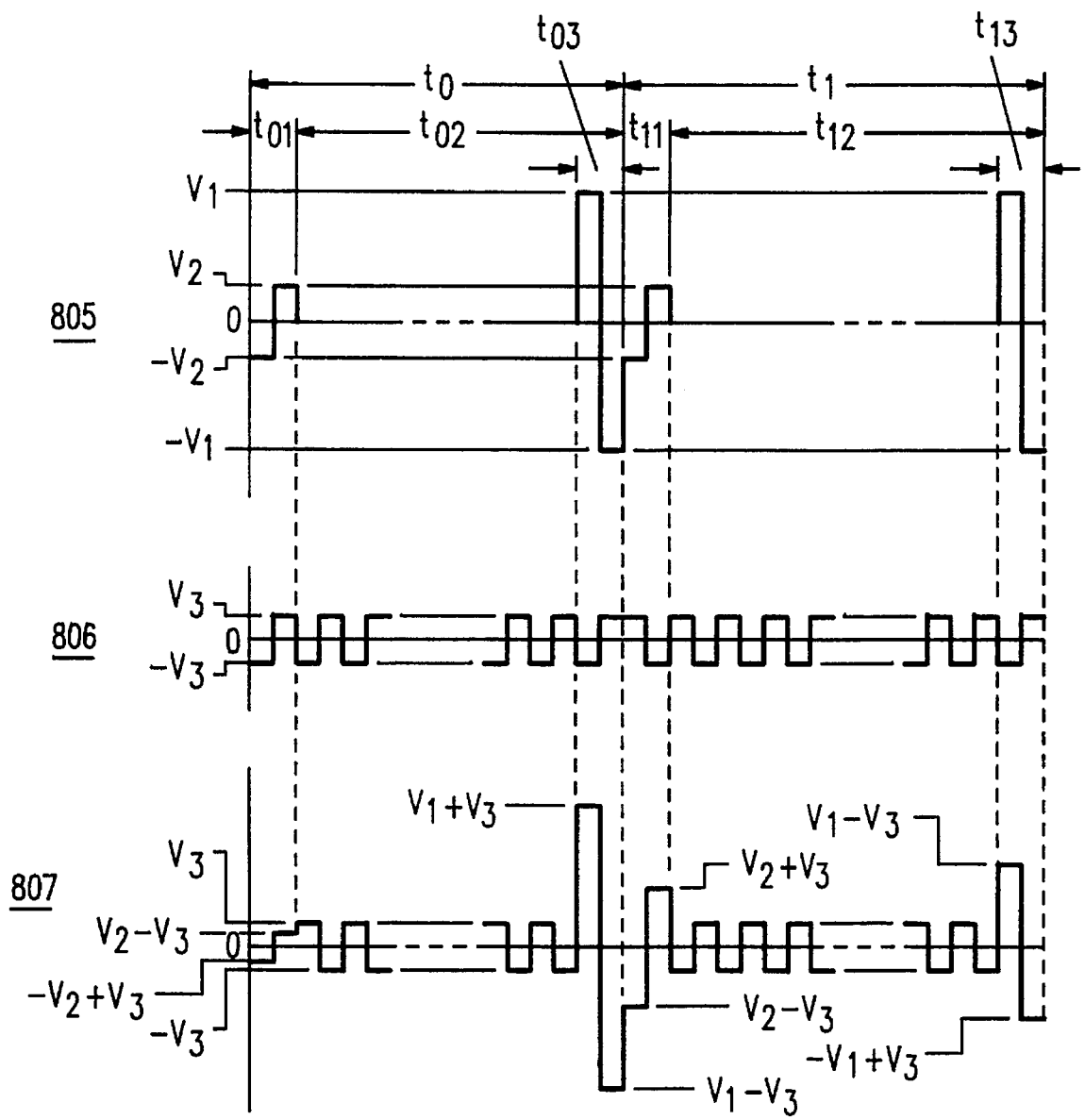
FIG. 13 is an illustration of the driving voltage waveforms in connection with the seventh embodiment of this invention.

The driving waveforms employed in this embodiment are illustrated in FIG. 13. In FIG. 13, the applied scan electrode waveform is shown at 805, the applied signal electrode waveform is shown at 806, and the composite waveform of applied waveforms 805 and 806 is shown at 807. Scan frames in time periods $t_0$ and $t_1$, respectively, indicate frames in which a 360° twisted state, i.e., OFF condition, and uniform state, i.e., ON condition, are selected. Time periods $t_{01}$ and $t_{11}$ correspond to selection periods, while time periods $t_{02}$, $t_{03}$ and $t_{12}$, $t_{13}$ correspond to nonselection periods. At the end of the nonselection period, a period is established in which a voltage pulse, such as, $\pm(V_1+V_3)$ in $t_{03}$ and $\pm(V_1-V_3)$ in $t_{13}$, having an absolute value greater than $V_{th}$, is applied to bring about Frederick's transition. In OFF selection frame $t_0$, after a voltage pulse (not shown) whose absolute value is greater than $V_{th}$ is applied immediately prior to selection period $t_{01}$ bringing on Frederick's transition, a pulse $\pm(V_2-V_3)$, whose voltage absolute value is less than $V_c$, is applied bringing about selection of the OFF state in selection period $t_{01}$. In nonselection period $t_{02}$, a pulse $\pm V_3$, whose voltage absolute value is less than $V_{th}$ (0°) and $V_{th}$ (360°), is applied to facilitate multiplex driving. In ON selection frame $t_1$, a pulse $\pm(V_2-V_3)$, whose absolute value is greater than $V_c$, is applied in selection period $t_{11}$ bringing about selection of the ON state. A pulse $\pm V_3$, whose voltage absolute value is less than $V_{th}$ (0) and $V_{th}$ (360), is applied in nonselection period $t_{12}$ to facilitate multiplex driving. When a LC element according to this embodiment was operated at 30° C. and with $V_1=30.0$ v, $V_2=1.5$ v, $V_3=1.0$ v, pulse width $P_w=250$ μs, and a duty ratio of 1/400 ($t_{01}=t_{11}=500$ μs, $t_0=t_1=400\times500$ μs), selective switching of the element was achieved.

Eighth Embodiment

Figure 14:
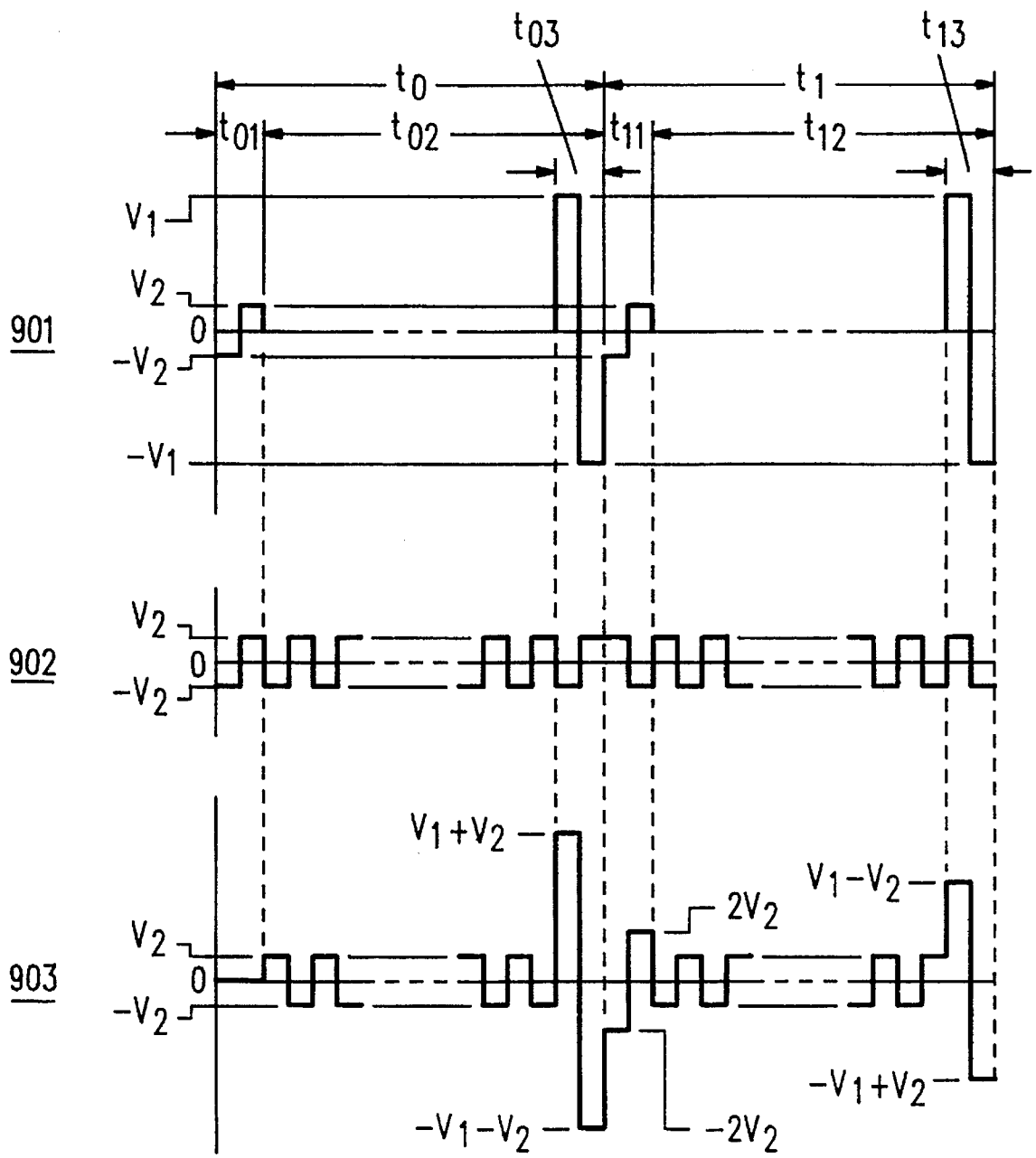
FIG. 14 is an illustration of the driving voltage waveforms in connection with the eighth embodiment of this invention.

FIG. 14 illustrates further different driving voltage waveforms applied to the liquid crystal display device of the seventh embodiment. In FIG. 14, the applied scan electrode waveform is shown at 901, the applied signal electrode waveform is shown at 902, and the composite waveform of applied waveforms 901 and 902 is shown at 903. Scan frames represented by time periods, $t_0$ and $t_1$ indicate frames respectively in which a 360° twisted state, i.e., OFF condition, and uniform state, i.e., ON condition, are selected. The occurrence of frames during time periods $t_{01}$ and $t_{11}$ correspond to selection periods, and time periods $t_{02}$, $t_{03}$ and $t_{12}$, $t_{13}$ correspond to nonselection periods. At the end of the nonselection periods, a period is established in which a voltage pulse, such as, $\pm(V_1+V_2)$ in $t_{03}$ and $t_{13}$, having an absolute value greater than $V_{th}$, is applied to bring about Frederick's transition. In OFF selection frame $t_0$, after a voltage pulse (not shown) whose absolute value is greater than $V_{th}$ is applied immediately prior to selection period $t_{01}$ and Frederick's transition is brought about, a pulse, whose voltage absolute value is 0 ($\leq V_c$), is applied bring about selection of the OFF state in selection period $t_{01}$. In nonselection period $t_{02}$, a pulse $\pm V_2$ whose voltage absolute value is less than $V_{th}$ (0°) and $V_{th}$ (360°) is applied to facilitate multiplex driving. In ON selection frame $t_1$, a pulse $\pm 2V_2$ with an absolute value greater than $V_c$ is applied in selection period $t_{11}$ bring about selection of the ON state is selected. A pulse $\pm V_2$, whose voltage absolute value is less than $V_{th}$ (0°) and $V_{th}$ (360°), is applied in nonselection period $t_{12}$ to facilitate multiplex driving. The driving waveforms of this embodiment are equivalent to those in the seventh embodiment where $V_2=V_3$. When a LC element according to this embodiment was operated at 30° C. and with $V_1=30.0$ v, $V_2=1.0$ v, pulse width $P_w=250$ μs, and a duty ratio of 1/400 ($t_{01}=t_{11}=500$ μs, $t_0=t_1=400\times500$ μs), selective switching of the element was achieved.

Figure 15:
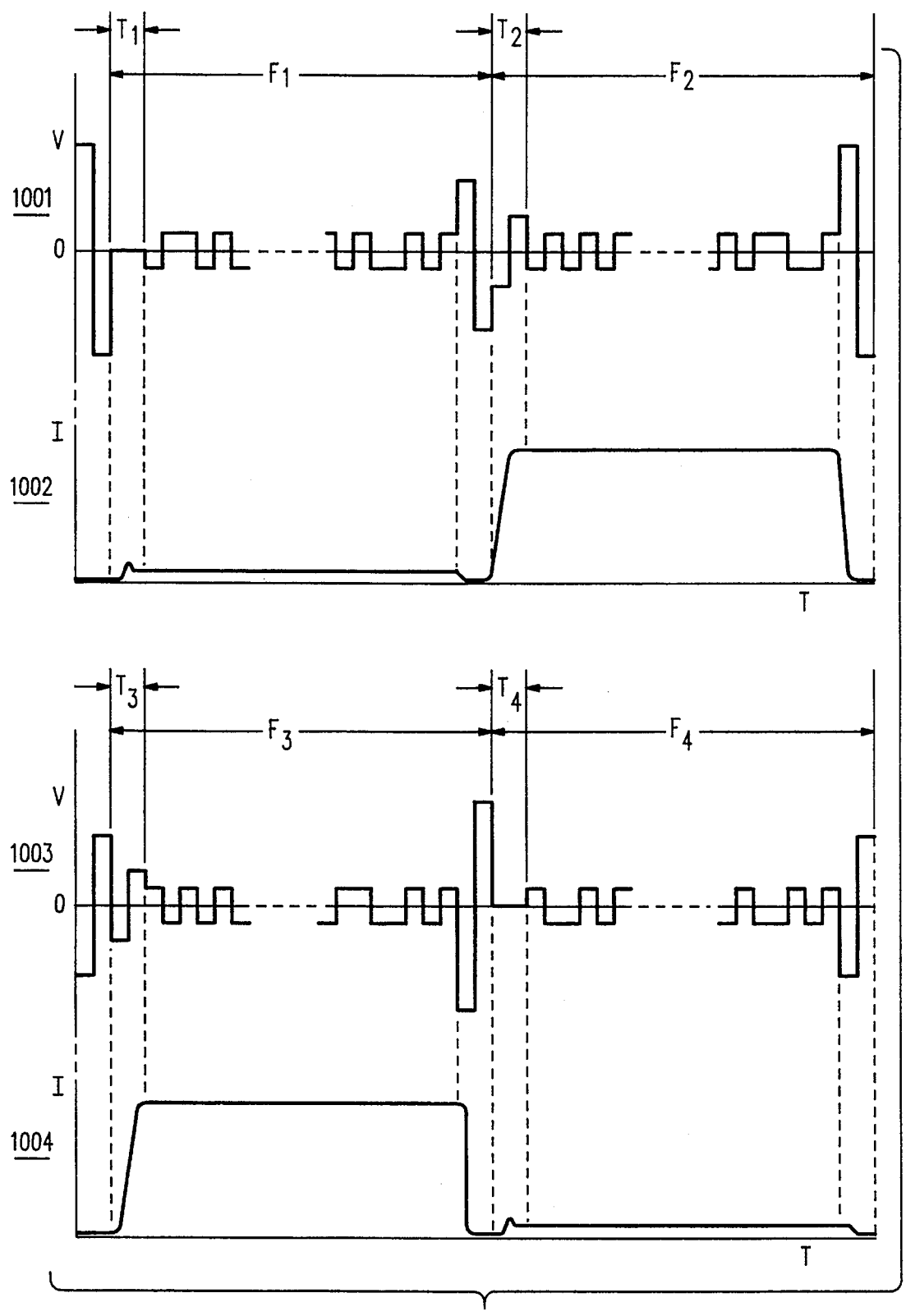
FIG. 15 is a diagram of the driving waveforms and the corresponding optical response according to the eighth embodiment of this invention.

In FIG. 15, the optical response is indicated at 1002, 1004 of an addressed picture cell of the device corresponding to the composite driving waveforms 1001, 1003 applied to the liquid crystal medium when operated with polarizing plates, where a 360° twisted state is the dark state and the uniform state is the bright or light transmissive state. In FIG. 15, $F_1$ and $F_4$ indicate OFF selection frames, $F_2$ and $F_3$ indicate ON selection frames, and $T_1$, $T_2$, $T_3$ and $T_4$ are respective selection periods. The light transmittance in the bright state with this optical arrangement was 72%, and the contrast ratio between the two states was 88.

The sequential timing of waveforms applied on adjacently selected scan electrodes when the driving waveforms of the seventh embodiment are applied in this eighth embodiment are the same as shown in FIG. 8.

Ninth Embodiment

Figure 16:
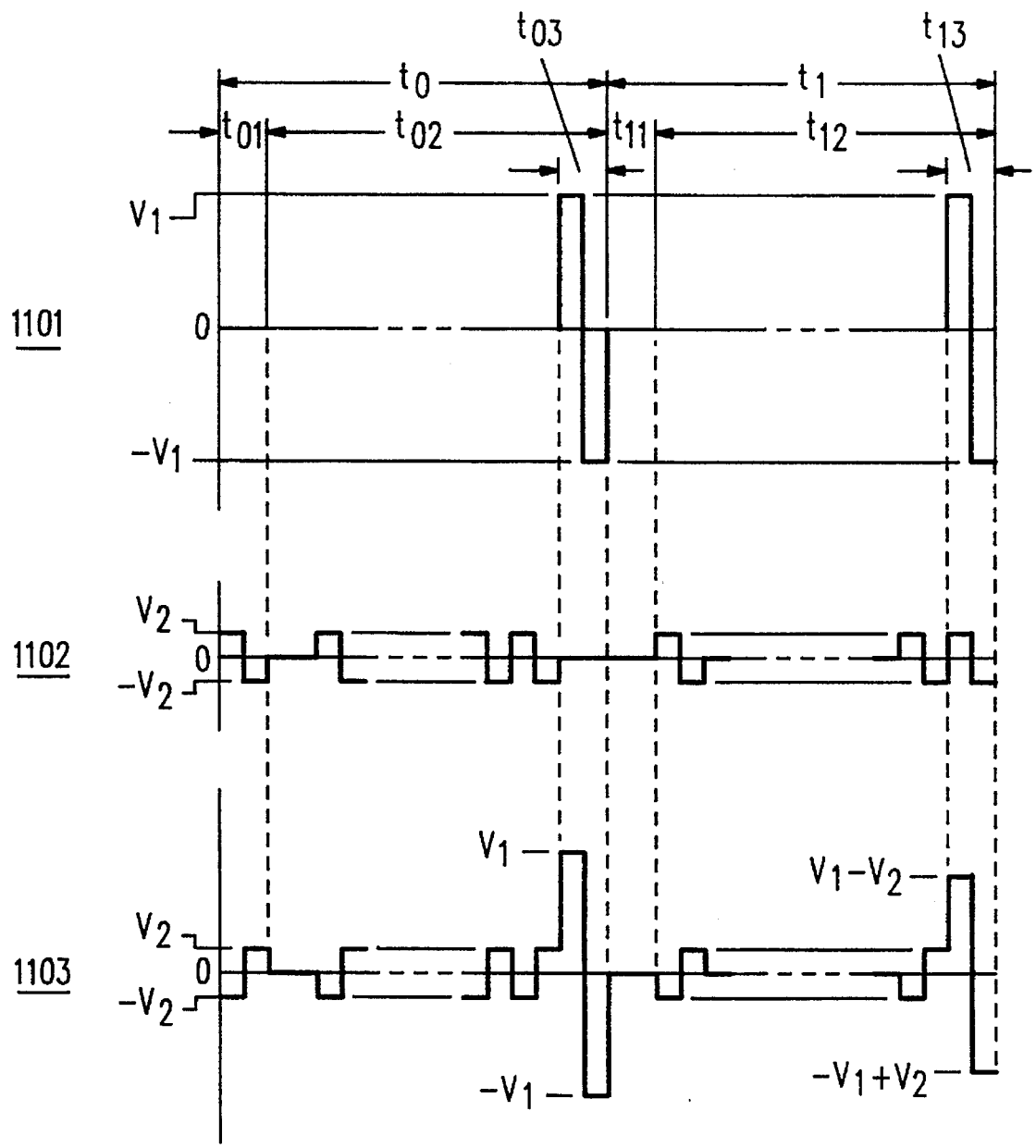
FIG. 16 is an illustration of the driving voltage waveforms in connection with the ninth embodiment of this invention.

FIG. 16 illustrates other driving waveforms applied in the liquid crystal display device of the seventh embodiment. In FIG. 16, the applied scan electrode waveform is shown at 1101, the applied signal electrode waveform is shown at 1102, and the composite waveform of applied waveforms 1101 and 1102 is shown at 1103. The frames occurring during time periods $t_0$ and $t_1$ respectively indicate frames in which a uniform state, i.e., ON condition, and a 360° twisted state, i.e., OFF condition, are selected. The occurrence of frames in time periods $t_{01}$ and $t_{11}$ correspond to selection periods, and time periods $t_{02}$, $t_{03}$ and $t_{12}$, $t_{13}$ correspond to nonselection periods. At the end of the nonselection period, a period is established in which a voltage pulse, such as, $\pm V_1$ in $t_{03}$ and $\pm(V_1-V_2)$ in $t_{13}$, having an absolute value greater than the threshold value of the element is applied to bring about Frederick's transition. In ON selection frame $t_0$, after a voltage pulse (not shown) whose absolute value is greater than $V_{th}$ is applied immediately prior to selection period $t_{01}$ to bring on Frederick's transition, a pulse $\pm V_2$, whose voltage absolute value is greater than $V_c$, is applied bringing about selection of the ON state in selection period $t_{01}$. In nonselection period $t_{02}$, a pulse $\pm V_2$, whose voltage absolute value is less than $V_{th}$ (0°) and $V_{th}$ (360°), is applied to facilitate multiplex driving. In OFF selection frame $t_1$, a pulse, whose absolute value is 0 ($\leq V_c$), is applied in selection period $t_{11}$ bringing about selection of the OFF state. A pulse, $\pm V_2$ or 0, whose voltage absolute value is less than $V_{th}$ (0°) and $V_{th}$ (360°), is applied in nonselection period $t_{12}$ to facilitate multiplex driving. When a LC element according to this embodiment was operated at 30° C. and with $V_1$=30.0 v, $V_2$=2.0 v, pulse width $P_w$=200 µs, and a duty ratio of 1/400 ($t_{01}=t_{11}$=400 µs, $t_0 = t_1$=400×400 µs), selective switching of the element was achieved.

Tenth Embodiment

Figure 17:
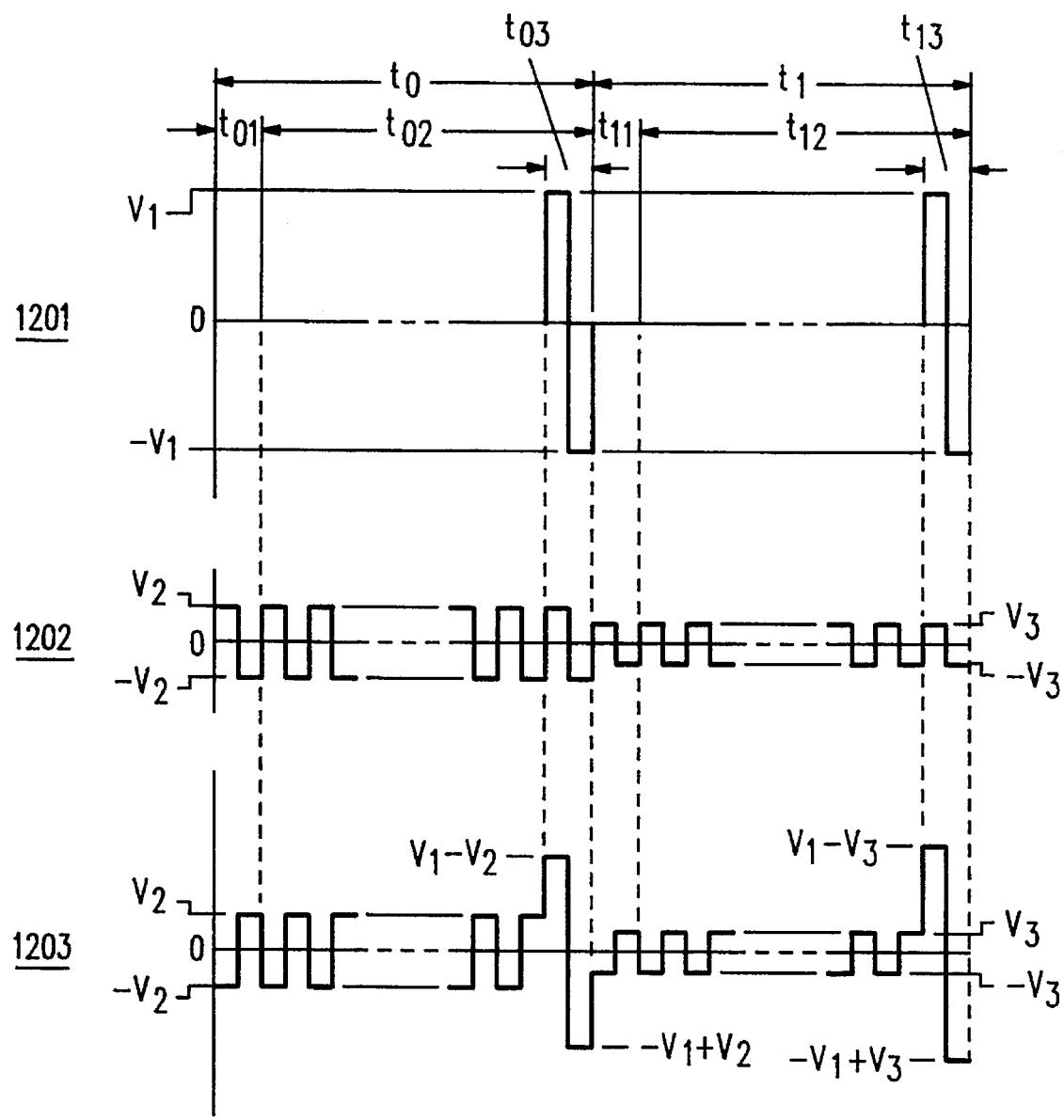
FIG. 17 is an illustration of the driving voltage waveforms in connection with the tenth embodiment of this invention.

FIG. 17 illustrates other driving waveforms applied to the liquid crystal display device of the seventh embodiment. In FIG. 17, the applied scan electrode waveform is shown at 1201, the applied signal electrode waveform is shown at 1202, and the composite waveform of applied waveforms 1201 and 1202 is shown at 1203. The frames occurring during time periods to and $t_1$ respectively indicate frames in which a uniform state, i.e., ON condition, and a 360° twisted state, i.e., OFF condition, are selected. Time periods $t_{01}$ and $t_{11}$ correspond to selection periods, and time periods $t_{02}$, $t_{03}$ and $t_{12}$, $t_{13}$ correspond to nonselection periods. At the end of the nonselection period, a period is established in which a voltage pulse, such as $\pm(V_1-V_2)$ in $t_{03}$ and $\pm(V_1-V_3)$ in $t_{13}$, having an absolute value greater than $V_{th}$, is applied to bring about Frederick's transition. In ON selection frame $t_0$, after a voltage pulse (not shown) whose absolute value is greater than $V_{th}$ is applied immediately prior to selection period $t_{01}$ to bring on Frederick's transition, a voltage pulse $\pm V_2$, whose absolute value is greater than $V_c$, is applied bringing about selection of the ON state in selection period $t_{01}$. In nonselection period $t_{02}$, a pulse, $\pm V_2$ or $\pm V_3$, whose voltage absolute value is lower than $V_{th}$ (0°) and $V_{th}$ (360°), is applied to facilitate multiplex driving. In OFF selection frame $t_1$, a pulse whose voltage absolute value is less than $V_c$ is applied in selection period $t_{11}$ bringing about selection of the OFF state. A pulse, $\pm V_2$ or $\pm V_3$, whose voltage absolute value is lower than $V_{th}$ (0°) and $V_{th}$ (360°), is applied in nonselection period $t_{12}$, to facilitate multiplex driving. When a LC element according to this embodiment was operated at 30° C. and with $V_1$=30.0 v, $V_2$=2.0 v, $V_3$=0.5 v, pulse width $P_w$=200 µs, and a duty ratio of 1/400 ($t_{01}=t_{11}$400 µs, $t_0=t_1$=400×400 µs), selective switching of the element was achieved.

Figure 18:
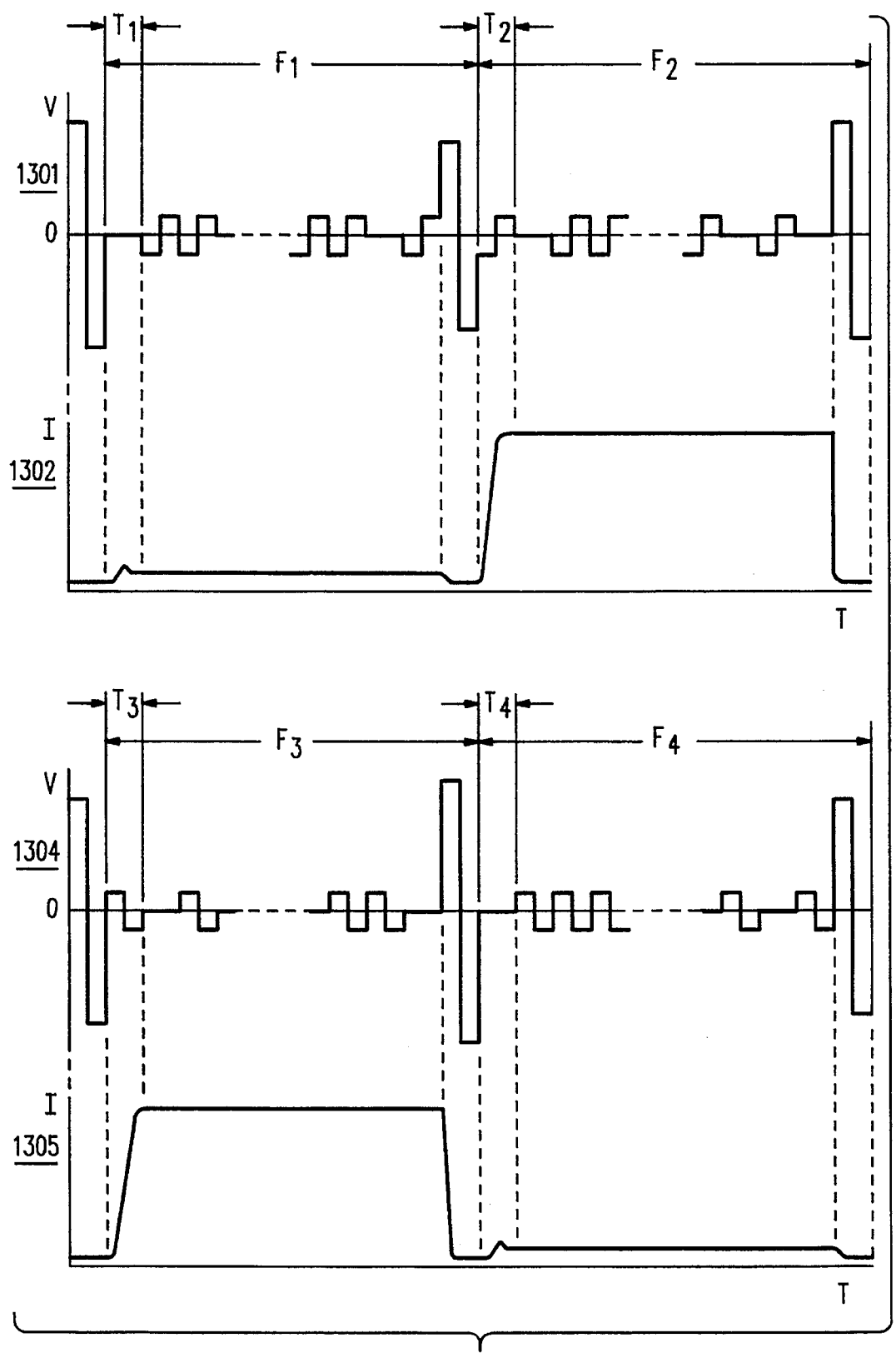
FIG. 18 is an illustration of the driving voltage waveforms and the corresponding optical response according to the tenth embodiment of this invention.

In FIG. 18, the optical response is indicated at 1302, 1305 of an addressed picture cell of the device which respectively corresponds to the composite driving waveforms 1301, 1304 applied to the liquid crystal medium when operated with polarizing plates, where a 360° twisted state is the dark state and the uniform state is the bright or light transmissive state. In FIG. 18, $F_1$ and $F_4$ indicate OFF selection frames, $F_2$ and $F_3$ indicate ON selection frames, and $T_1$, $T_2$, $T_3$ and $T_4$ are respective selection periods. The light transmittance in the bright state with this optical arrangement was 75%, and the contrast ratio between the two states was 66.

Figure 19:
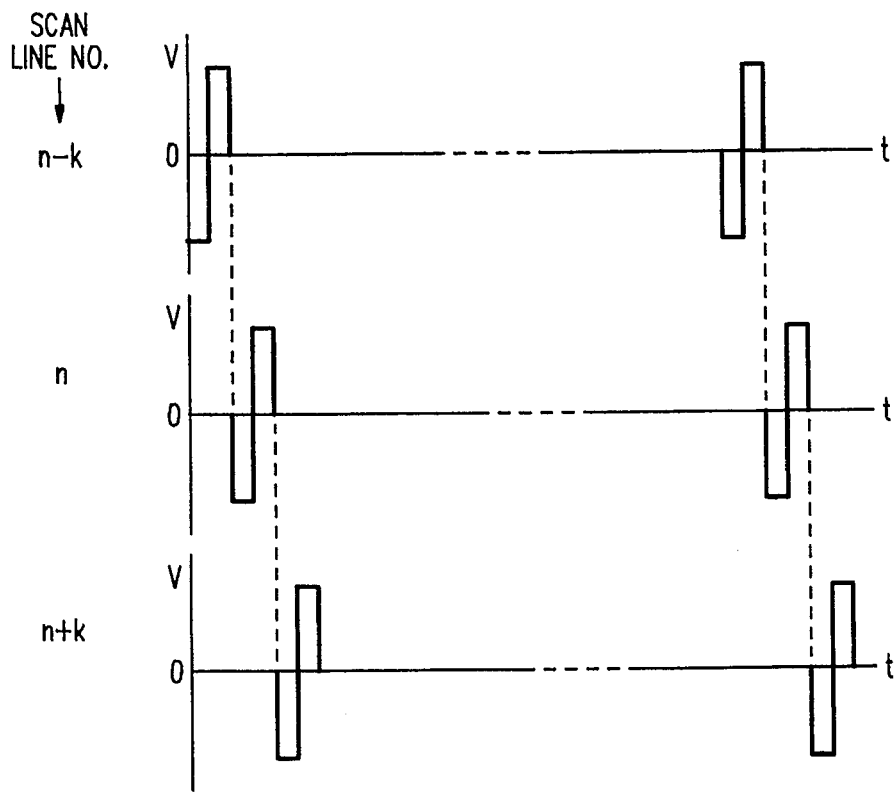
FIG. 19 is an illustration of the timing of the applied voltage waveforms to the scan electrodes according to the tenth embodiment of this invention.

FIG. 19 shows the sequential timing of waveforms applied on adjacently selected scan electrodes (n–k, n, n+k) when the driving waveforms of the ninth embodiment and this tenth embodiment are applied to an orthogonal matrix comprising plural signal and scan electrodes, and this sequential line scanning approach is utilized in the applied driving method.

Eleventh Embodiment

Where the critical voltage values are $V_{c1}$ and $V_{c2}$ when one or the other of the two metastable states is selected, depending on the magnitude of the rms value of the voltage pulse group applied immediately after bringing about Frederick's transition, then, the metastable state generated is according to the following voltage relationships:

(a) approximating the 360° twisted state when $0 \leq V_r < V_{c1}$.

(b) approximating the 0° (uniform or untwisted) state when $V_{c1} \leq V_r < V_{c2}$.

(c) approximating the 360° twisted state when $V_{c2} \leq V_r$.

Figure 20:
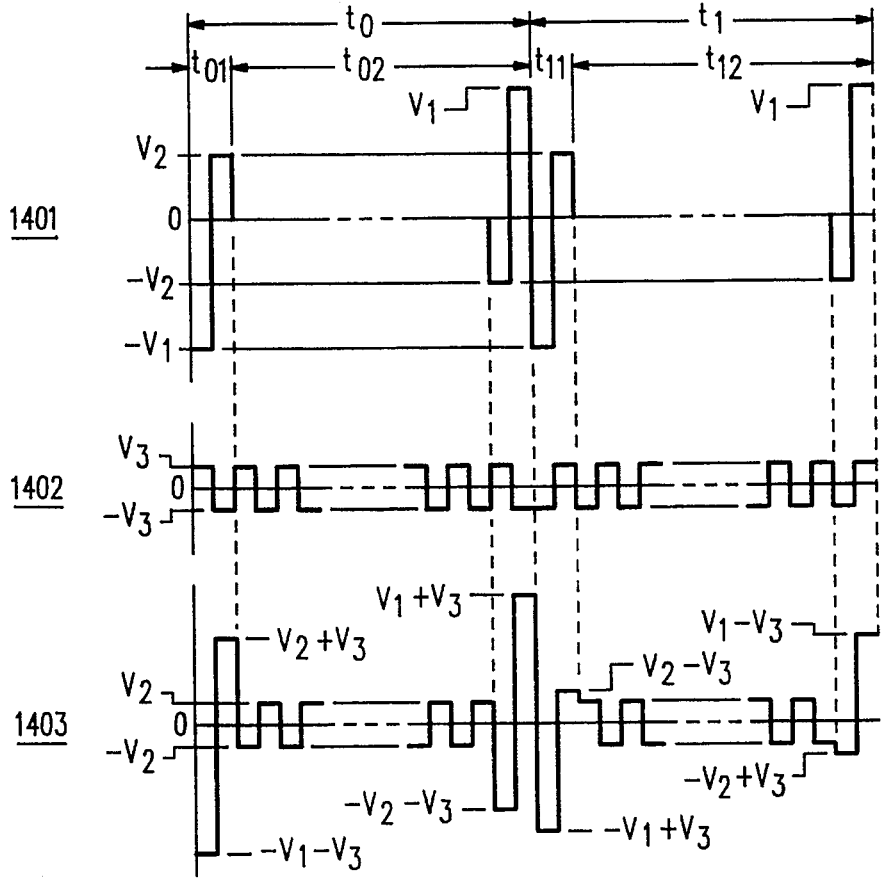
FIG. 20 is an illustration of the driving voltage waveforms in connection with the eleventh embodiment of this invention.

FIG. 20 illustrates still further driving voltage waveforms applied to the liquid crystal display device of the seventh embodiment. In FIG. 20, the applied scan electrode waveform is shown at 1401, the applied signal electrode waveform is shown at 1402, and the composite waveform of applied waveforms 1401 and 1402 is shown at 1403. A frame during the time periods $t_0$ and $t_1$ respectively indicate frames in which a 360° twisted state, i.e., OFF condition, and the uniform state, i.e., ON condition, are selected. Time periods $t_{01}$ and $t_{11}$ correspond to selection periods, and time periods $t_{02}$ and $t_{12}$ correspond to nonselection periods. At the end of the nonselection period and in the first half of the subsequent selection period, a period is established in which a voltage pulse, whose absolute value becomes $\pm(V_1 \pm V_3)$ depending on the superposed signal waveform and is greater than $V_{th}$, is applied to bring about Frederick's transition. In OFF selection frame $t_0$, after a voltage pulse $(-V_1-V_3)$ whose absolute value is greater than $V_{th}$ is applied in the first half of selection period $t_{01}$ to bring on Frederick's transition, a pulse $(V_2+V_3)$, whose voltage absolute value is greater than $V_{c2}$, is applied bringing about selection of the OFF state in the last half of selection period $t_{01}$. In nonselection period $t_{02}$, a pulse ($\pm V_3$), whose voltage absolute value is less than $V_{th}$ (0°) and $V_{th}$ (360°), is applied, to facilitate multiplex driving. In ON selection frame $t_1$, a voltage pulse $(-V_1+V_3)$ whose absolute value is greater than $V_{th}$ applied in the first half of selection period $t_{11}$ to bring on Frederick's transition, a pulse $(V_2-V_3)$, whose absolute value is greater than or equal to $V_{c1}$ and less than $V_{c2}$, is applied in the last half of selection period $t_{11}$ bringing about selection of the ON state. Since a pulse $\pm V_3$, whose voltage absolute value is less than $V_{th}$ (0°) and $V_{th}$ (360°), is applied in nonselection period $t_{12}$, to facilitate multiplex driving. When a LC element according to this embodiment was operated at 30° C. and with $V_1$=30.0 v, $V_2$=12.0 v, $V_3$=2.0 v, pulse width $P_w$=250 µs, and a duty ratio of 1/400 ($t_{01}=t_{11}$=500 µs, $t_0=t_1$=400×500 µs), selective switching of the element was achieved.

Figure 21:
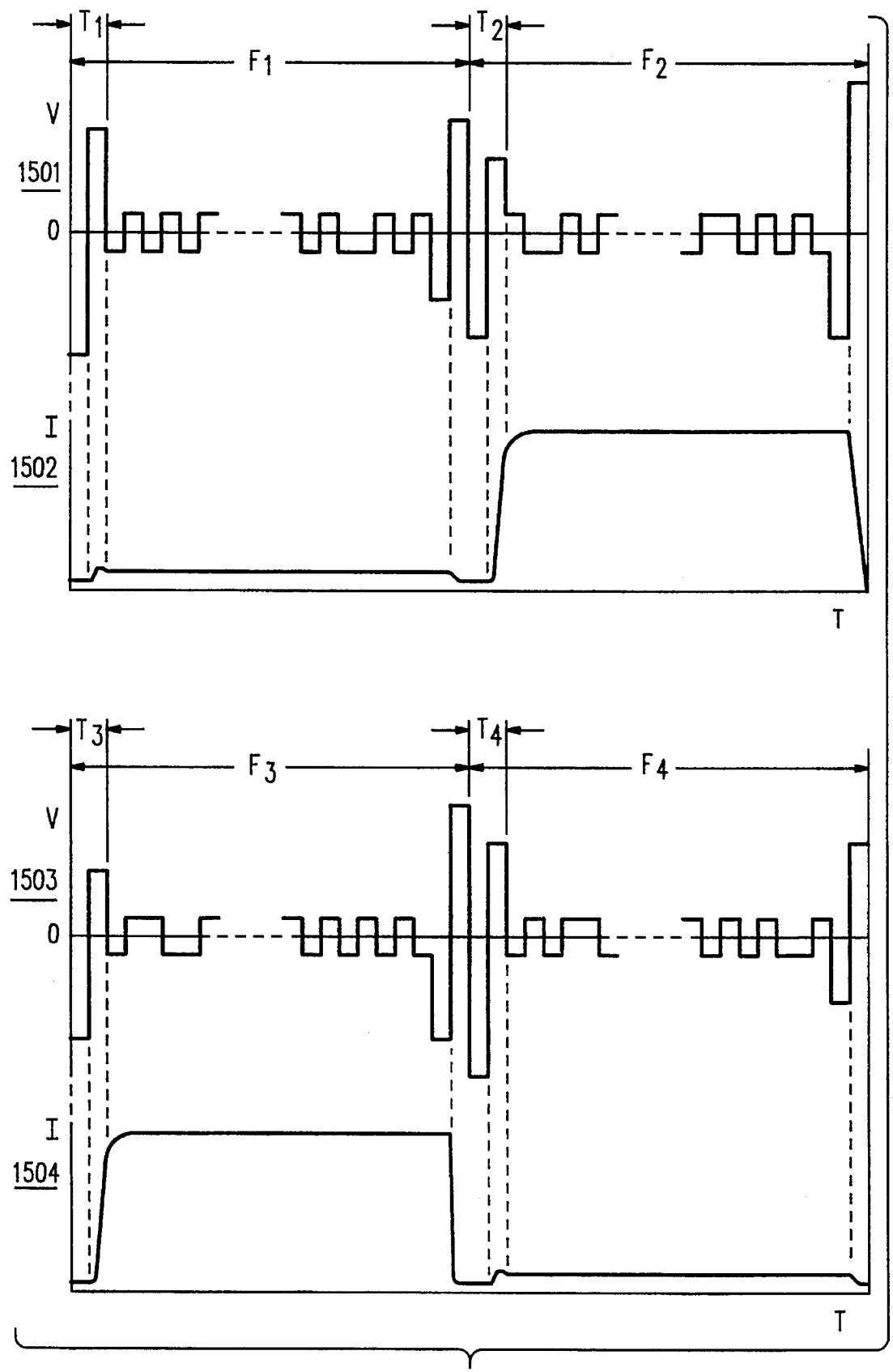
FIG. 21 is an illustration of the driving voltage waveforms and the corresponding optical response according to the eleventh embodiment of this invention.

In FIG. 21, the optical response is indicated at 1502, 1504 of an addressed picture cell of the device which respectively correspond to the composite driving waveforms 1501, 1503 applied to the liquid crystal medium when operated with polarizing plates, where a 360° twisted state is the dark state and the uniform state is the bright or light transmissive state. In FIG. 21, $F_1$ and $F_4$ indicate OFF selection frames, $F_2$ and $F_3$ indicate ON selection frames, and $T_1$, $T_2$, $T_3$ and $T_4$ are respective selection periods. The light transmittance in the bright state with this optical arrangement was 72%, and the contrast ratio between the two states was 88.

Figure 22:
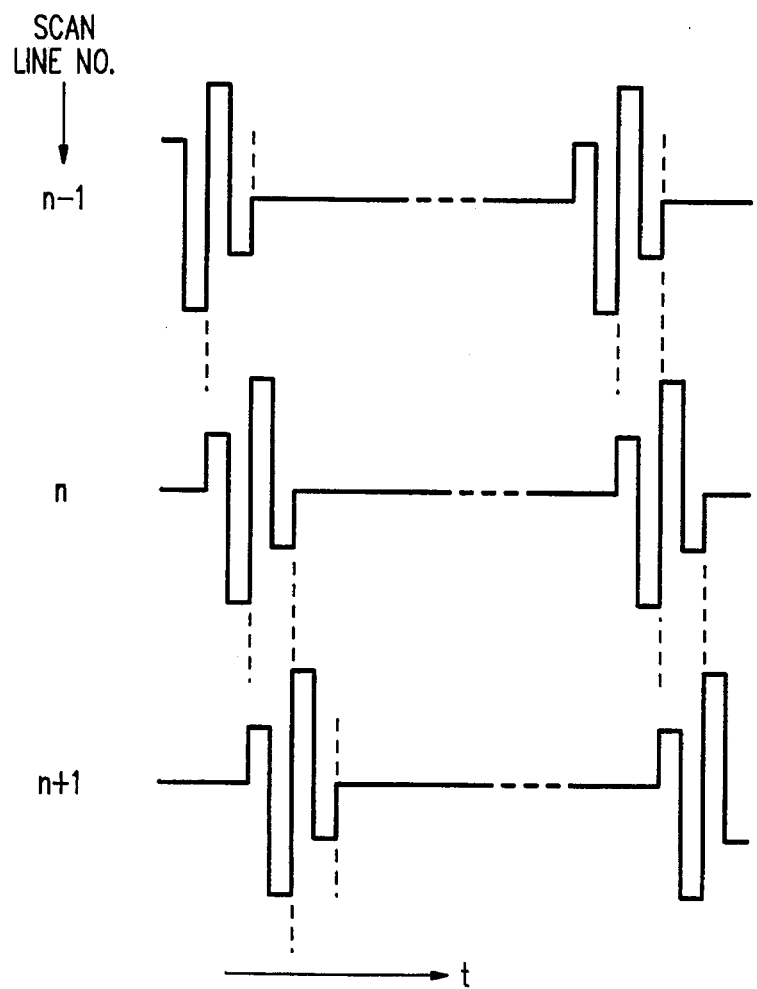
FIG. 22 is an illustration of the timing of the applied voltage waveforms to the scan electrodes according to the eleventh embodiment of this invention.

FIG. 22 shows the sequential timing of waveforms applied on adjacently selected scan electrodes (n−1, n, n+1) when the driving waveforms of this eleventh embodiment are applied to an orthogonal matrix comprising plural signal and scan electrodes, and this sequential line scanning approach is utilized in the applied driving method.

Twelfth Embodiment

An optically active compound, such as available from E. Merck Corp. as product No. S811, was added to a liquid crystal medium, such as available from E. Merck Corp. as product No. MJ90179, providing for a nematic phase and inducing a twist in the liquid crystals adjustable to a helical pitch, p, of 3.6 μm. The cell including the liquid crystal device comprises polyimide alignment layers formed respectively on upper and lower substrates beneath which are respectively disposed a scan electrode group and signal electrode group formed of ITO. The alignment layers on the upper and lower substrates are rubbed in opposite parallel directions (180°) which were thereafter positioned together in spatial relation separated by a gap, d, of 2.0 μm. When the prepared liquid crystal material was introduced into the formed gap, the interface pretilt angles of the molecular directors of the molecules adjacent to the upper and lower substrates were approximately 4° with opposite signs. Since the relationship, p/4<d<3p/4, holds true, the orientation of the liquid crystal molecules took on a 180° twisted state with a helical axis in a direction perpendicular to the planar extent of the substrate. The element structure of this liquid crystal display is the same as shown in FIG. 1. The resulting element of this configuration generates two metastable states approximating a 0° uniform or untwisted state and a 360° twisted state, depending on the applied driving voltage waveforms. The fabricated liquid crystal display device according to this embodiment utilized the circuit configuration shown in FIG. 4.

Figure 23:
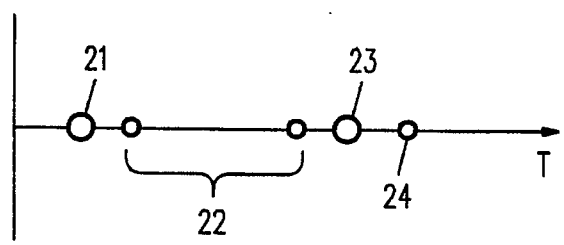
FIG. 23 is an operational time sequence diagram illustrating the sequence of operation employed in the twelfth embodiment of this invention.

An operational time sequence diagram is illustrated in connection with this embodiment in FIG. 23, wherein time, T, is plotted along the horizontal axis. Application of power ON of the power source is indicated at point 21 along time line, T. During the time period 22, the reset pulse is applied. Then, write scanning is started at point 23 followed by power ON for the illumination means at point 24. Assuming a liquid crystal display element member with two metastable states which differ from an initial orientation state and switchable between those two metastable states, a configuration is employed with a reset pulse period in which a voltage waveform for switching the initial orientation state to one of the two metastable states after powering ON at point 21 is achieved and begins actual write scanning at point 23 of display data followed by switch ON of the illumination means at point 24. As previously indicated, when write scanning is performed on the initial orientation state, three orientation states exist together which degrades the quality of the display. To avoid this problem, one of the metastable states is initially generated prior to illumination of the display. If the liquid crystal display element is a reflective type not requiring such illumination means, the switch ON at point 24 of the illumination means is, of course, omitted.

Figure 24:
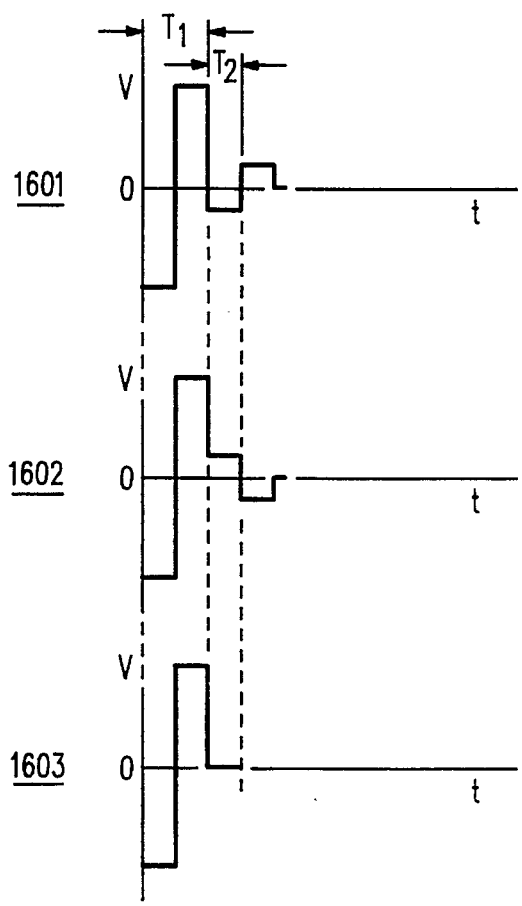
FIG. 24 is an illustration of the driving voltage waveforms according to the thirteenth embodiment of this invention.

FIG. 24 shows an example of the driving voltage waveforms applied on the liquid crystal layer during reset pulse period 22. In FIG. 24, time period $T_1$ is a period during which a pulse whose voltage absolute value is greater than the threshold value is applied to bring about Frederick's transition in the liquid crystal layer. Time period $T_2$ is a period during which a pulse is applied for selecting one or the other metastable states (a) whose polarity is opposite, as shown at waveform 1601, with respect to the immediately preceding pulse in time period $T_1$, or (b) whose polarity is the same, as shown at waveform 1602, with respect to the immediately preceding pulse in time period $T_1$; or (c) whose absolute value is zero, as shown at waveform 1603. Waveform 1601 generates a metastable state with a twist angle of approximately φ−180° with respect to the twist angle φ of the initial state, and waveforms 1602 and 1603 each generate a metastable state having a twist angle of approximately φ+180°. When a voltage of ±30 v was applied in time period $T_1$ with a pulse duration of 500 μs to the liquid crystal display device of this embodiment, a uniform orientation was achieved with waveform 1601 with an applied voltage of −1.5 v during time period $T_2$, and an orientation having an approximately 360° twist was achieved with waveforms 1602 and 1603 respectively with an applied voltage of +1.5 v and 0 v during time period $T_2$.

Thirteenth Embodiment

Figure 25:
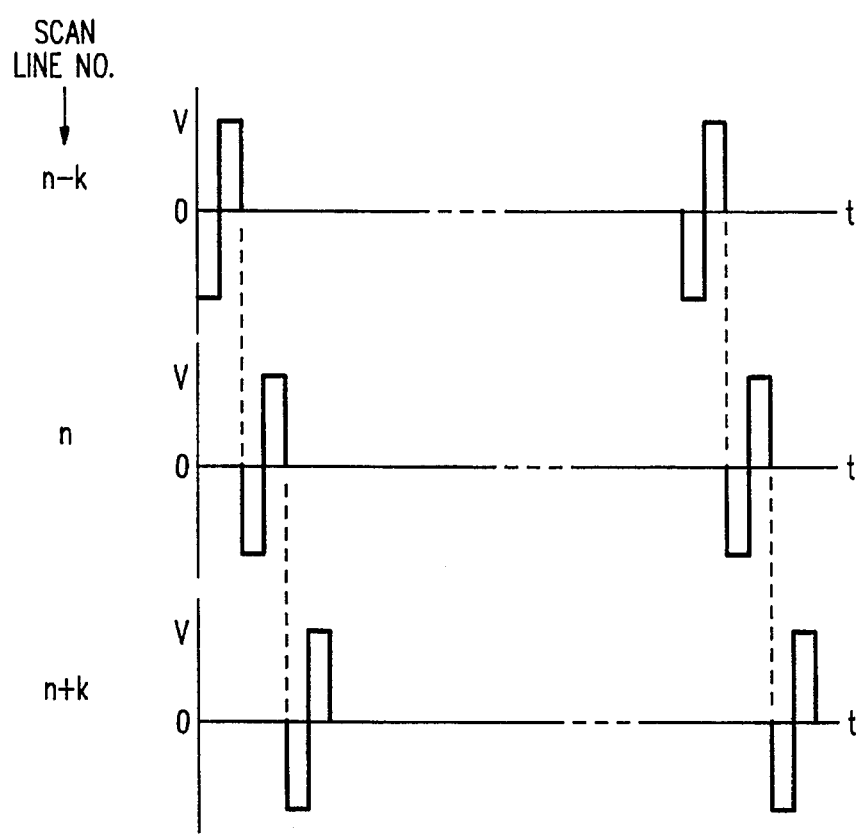
FIG. 25 is an illustration of the timing of the applied voltage waveforms to the scan electrodes according to the thirteenth embodiment of this invention.

Employing the driving voltage waveform of the twelfth embodiment, as shown in FIG. 24, similar effects can be achieved by sequential line scanning. FIG. 25 shows the sequential timing when a driving waveform is applied on adjacent scan electrodes (2k+1), whose centrally disposed electrode is the $n^{th}$ electrode, by shifting the phase every k number of scan electrodes. In FIG. 25, the phase difference is equivalent to two pulses using waveform 1603 in FIG. 24. However, waveforms 1601 and 1602 in FIG. 24 may be used, or the phase difference may also be set as desired. Assuming k=1, then sequential line scanning is performed on every other scan electrode, and if k≧2, then scanning can be performed in electrode blocks. As in the case of the twelfth embodiment, waveform 1601 generates a metastable state with a twist angle of approximately φ−180°, with respect to the twist angle φ in the initial state, and waveforms 1602 and 1603 generates a metastable state with a twist angle of approximately φ+180°. When the liquid crystal display device described above was applied using the voltage and pulse duration conditions of the twelfth embodiment with k=1, a uniform orientation was obtained with waveform 1601, and an approximately 360° twisted orientation was achieved with both waveforms 1602 and 1603.

Fourteenth Embodiment

Figure 26:
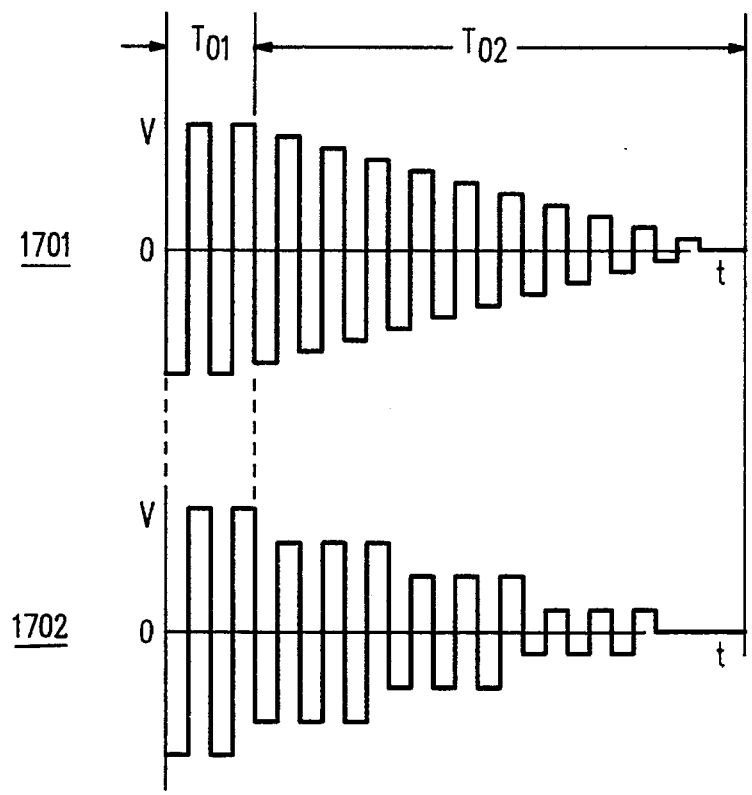
FIG. 26 is an illustration of the driving voltage waveforms according to the fourteenth embodiment of this invention.

FIG. 26 shows examples of monotonically decreasing driving voltage waveforms 1701 and 1702 as applied relative to the twelfth and thirteenth embodiments. Waveforms 1701 and 1702 comprise (1) a first period in which the driving waveform for generating one of the two metastable states applies a voltage pulse with an absolute value greater than the threshold value in the initial state and, then, applies a voltage pulse group whose absolute value for generating Frederick's transition in the liquid crystal molecules is greater than the threshold value of the element, and (2) a second period in which the voltage absolute value of the voltage pulse group is reduced gradually or in plural steps and a metastable state with a twist angle of approximately φ−180° with respect to the twist angle of the liquid crystal in the initial state is generated. In FIG. 26, the time period $T_{01}$ corresponds to the period during which Frederick's transition is generated in the liquid crystal molecules, and the time period $T_{02}$ corresponds to the period during which the voltage absolute value is gradually or monotonically reduced. Waveform 1701 illustrates alternating step voltage pulses of continually diminishing voltage value while waveform 1702 illustrates alternating step voltage pulses of periodic diminishing voltage value. Metastable states with stable orientation can be achieved with the application of these respective monotonically decreasing waveforms 1701 and 1702 to the liquid crystal display device of this invention.

By means of the methods described in the twelfth to the fourteenth embodiments, the liquid crystal display reverts to a uniform orientation state when the backlight or other illumination means is switched ON or when operation begins and the subsequent write scanning commences.

Fifteenth Embodiment

Figure 28:
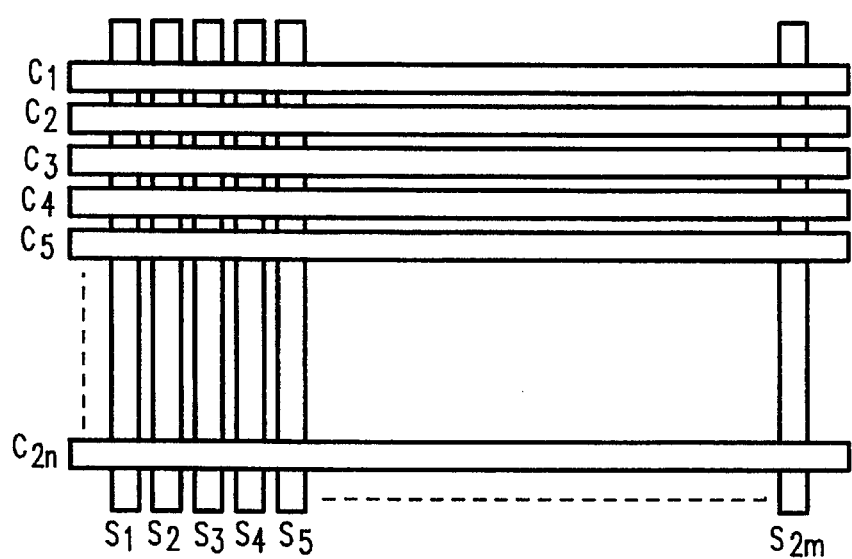
FIG. 28 is a diagrammatic view of the signal and scan electrode configuration in connection with the fifteenth embodiment of this invention.
Figure 27:
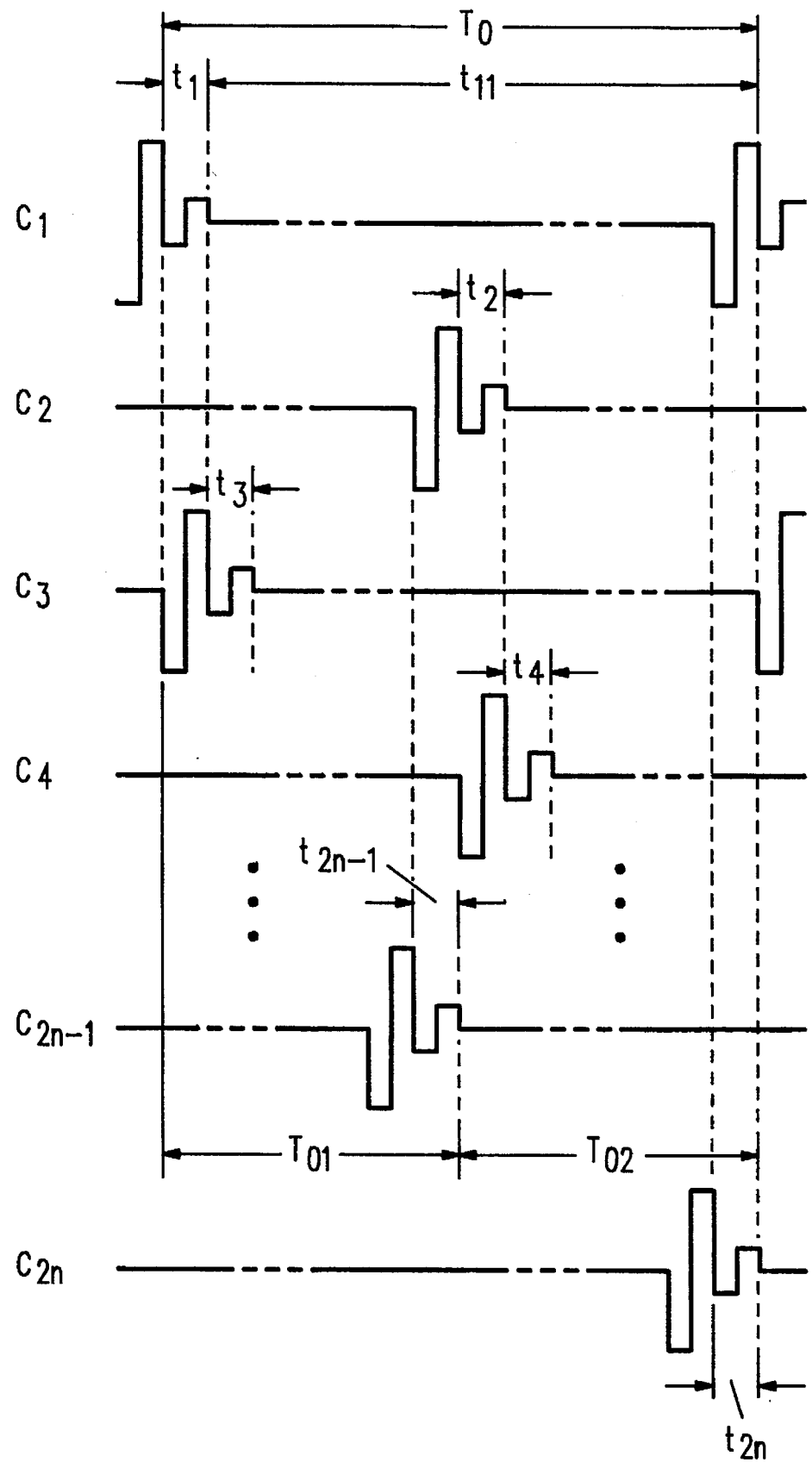
FIG. 27 is an illustration of the driving voltage waveforms according to the fifteenth embodiment of this invention.

FIG. 27 illustrates the voltage waveforms applied on scan electrodes $C_1$–$C_4$, $C_{2n-1}$ and $C_{2n}$ when the scan electrodes are divided into two blocks each comprising n number of odd-numbered rows and even-numbered rows and each is sequentially line scanned; i.e., they are scanned in the order $C_1$, $C_3$, $C_5$, . . . , $C_{2n-1}$, $C_2$, $C_4$, $C_6$, . . . , $C_{2n}$, in the time-shared addressing of a display element comprising 2n (wherein n is an integer) scan electrodes ($C_1$, $C_2$, . . . , $C_{2n}$) as shown in FIG. 28. In FIG. 27, time period $t_1$ is the selection period for scan electrode $C_1$, and time period $t_{11}$ is the nonselection period. Immediately after time period $t_1$, the selection period for $C_3$ is set, immediately after which the selection period for $C_5$ (not shown) is set, and so on. This selection and scan of the odd-numbered rows is completed in time period $T_{01}$. In the following time period $T_{02}$, the even-numbered rows are similarly selected and scanned such that one screen of information is written during the total time period $T_0$ ($T_0 = T_{01} + T_{02}$). By applying the method described above to the voltage drive waveforms of any of the above embodiments, the required scan time period can be shorted by one half, and flicker in the display due to screen scanning was significantly reduced. Also, to be noted in this embodiment, an example is given in which scanning is performed by skipping every other scan electrode so that one screen of displayed data was written by scanning twice the display screen. However, the number of scan electrodes skipped and the number of blocks the scan electrodes are divided into can be set to any desired value. When n scan electrodes are divided into blocks each having k scan electrodes, one screen is formed by scanning n/k times. Where the time selection time period required to select one row is $T_s$, the following relationship should be satisfied:

$$k/(T_s \cdot n) \geq f_c,$$

wherein $f_c$ is the critical frequency (Hz) at which an observer becomes aware of any display screen flicker.

Sixteenth Embodiment

Since the liquid crystal display element of this invention utilizes two metastable states in the display of data, a written display is retained as a memory condition over a fixed period, identified hereinafter as $T_m$. Therefore, the continuous scanning of all scan electrodes is performed in cycles defined by $$f_{ref} > 1/T_m \text{ (Hz)},$$

and, upon completion of one continuous scan, the display of an entire screen can be maintained by sequential line application of a selected waveform in the time period, $$1/f_{ref} - T_2 \cdot n,$$

wherein n is the total number of scan electrodes in the display.

This sequential line application, however, need only be applied to scan electrodes containing areas wherein it is necessary to rewrite the displayed data. When we applied the above method using $f_{ref} = 1.67 \times 10^{-2}$ to the driving waveforms of each of the above embodiments, except for the period during which scanning of the entire screen was performed in one cycle every 60 seconds, there were no optical fluctuations in areas where display data was not rewritten. In areas where it is necessary to rewrite display data involving a total number of scan lines $n_s$, a LC display can be realized in which overall flicker is significantly reduced because partial scanning can be performed at a greater frequency of $1/n_s$ (Hz).

While the invention has been described in conjunction with several specific embodiments, it is evident to those skilled in the art that many further alternatives, modifications and variations will be apparent in light of the forgoing description. Thus, the invention described herein is intended to embrace at such alternatives, modifications, applications and variations as fall within the spirit and scope of the appended claims.

What is claimed is:

1. A liquid crystal display, comprising:

a chiral nematic liquid crystal medium interposing a pair of electrode substrates having alignment layers formed on their respective surfaces, said chiral nematic liquid crystal medium having a twisted structure with a twist angle $\phi$ in a preselected state comprising one of a first metastable state, a second metastable state, a reset state, and an arbitrary state; and a drive circuit in communication with said chiral nematic liquid crystal medium for (a) applying a reset voltage across said liquid crystal display electrodes to induce a transition from the preselected state to the reset state in said chiral nematic liquid crystal medium; and (b) after application of the reset voltage, applying one of:

(1) a first metastable activation voltage greater than a critical voltage and less than the reset voltage to place said chiral nematic liquid crystal medium in the first metastable state; and (2) a second metastable activation voltage less than both the critical voltage and the reset voltage to place said chiral nematic liquid crystal medium in the second metastable state.

2. The liquid crystal display of claim 1, wherein when the preselected state of said chiral nematic liquid crystal medium is the first metastable state, said drive circuit applies the reset voltage and the second metastable activation voltage in succession to induce the second metastable state therein.

3. The liquid crystal display of claim 1, wherein when the preselected state of said chiral nematic liquid crystal medium is the second metastable state, said drive circuit applies the reset voltage and the first metastable activation voltage in succession to induce the first metastable state therein.

4. The liquid crystal display of claim 1, wherein the first and second metastable states represent respective relaxation states in said chiral nematic liquid crystal medium after inducing a Frederick's transition therein.

5. The liquid crystal display of claim 1, wherein the drive circuit applies the reset voltage to induce a Frederick's transition in said chiral nematic liquid crystal medium.

6. The liquid crystal display of claim 1, wherein molecular directors of liquid crystal molecules in said chiral nematic liquid crystal medium interposing said alignment layer planar surfaces are oriented at an angle $\Theta$ therefrom.

7. The liquid crystal display of claim 1, wherein an orthogonally arranged scan electrode group and signal electrode group are respectively formed on said substrates, wherein cross points of said electrodes represent picture cells; and further comprising means coupled to said electrodes to provide time-shared addressing of said electrode groups.

8. The liquid crystal display of claim 7, wherein said drive circuit successively applies the reset voltage and one of said first and second metastable activation voltages to all said picture elements before said picture cells undergo time-shared addressing.

9. The liquid crystal display of claim 7, wherein said drive circuit applies the reset voltage and one of said first and second metastable activation voltages to said picture cells on a sequential scan electrode group basis.

10. The liquid crystal display of claim 7, wherein in said scan electrode group, n number of scan electrodes are divided into a plurality of electrode blocks comprising k ($k \leq n$) number of scan electrodes, each of said blocks being sequentially line scanned such that each screen frame is time-shared n/k times.

11. The liquid crystal display of claim 1, wherein said drive circuit successively applies:

the reset voltage for a first time period;

either metastable activation voltage for a second time period; and a third voltage less than either metastable activation voltage for a third time period.

12. The liquid crystal display of claim 11, wherein a selection period relative to said time-shared addressing occurs during the first and second time periods and a nonselection period occurs during the third time period.

13. The liquid crystal display of claim 11, wherein a selection period relative to said time-shared addressing occurs during the second time period and a nonselection period occurs during the first and third time periods.

14. The liquid crystal display of claim 11, wherein only scan electrodes including picture cells that must be rewritten with new data in a next succeeding screen frame are time-shared addressed during the first and second time periods.

15. The liquid crystal display of claim 1, wherein the arbitrary state includes an initial state having a twist angle $\phi_0$.

16. The liquid crystal display of claim 15, wherein the first metastable state has a twist angle approaching $\phi_0 - 180°$.

17. The liquid crystal display of claim 16, wherein the second metastable state has a twist angle approaching $\phi_0 + 180°$.

18. The liquid crystal display of claim 17, wherein an orthogonally arranged scan electrode group and signal electrode group are respectively formed on said substrates, wherein cross points of said electrodes represent picture cells; and further comprising means coupled to said electrodes to provide time-shared addressing of said electrode groups.

19. The liquid crystal display of claim 18 wherein in said scan electrode group, n number of scan electrodes are divided into a plurality of electrode blocks comprising k ($k \leq n$) number of scan electrodes, each of said blocks being sequentially line scanned such that each screen frame is time-shared n/k times.

20. The liquid crystal display of claim 15, wherein the second metastable state has a twist angle approaching $\phi_0 + 180°$.

21. A liquid crystal display device, comprising:

a chiral nematic liquid crystal medium interposing a pair of electrode substrates having alignment layers formed on their respective surfaces positioned in facing relation thereto, said chiral nematic liquid crystal medium having a twisted structure with a twist angle $\phi_0$ in an initial state and having first and second metastable states different from the initial state, the first and second metastable states representing respective relaxation states in said chiral nematic liquid crystal medium after inducing a Frederick's transition therein; and a drive circuit coupled to said chiral nematic liquid crystal display medium for (a) applying a reset voltage to induce a Frederick's transition in said chiral nematic liquid crystal medium from a current state, the current state being selected from the group consisting of the initial state, the first metastable state, the second metastable state, and an arbitrary state; and (b) after application of the reset voltage, applying one of:
 (1) a first metastable voltage greater than a critical voltage and less than the reset voltage to place said chiral nematic liquid crystal medium in the first metastable state; and
 (2) a second metastable voltage less than both the critical voltage and the reset voltage to place said chiral nematic liquid crystal medium in the second metastable state.

22. The liquid crystal display of claim 21, wherein when the current state of said chiral nematic liquid crystal medium is the first metastable state, said drive circuit applies the reset voltage and the second metastable voltage in succession to induce the second metastable state therein.

23. The liquid crystal display of claim 21, wherein when the current state of said chiral nematic liquid crystal medium is the second metastable state, said drive circuit applies the reset voltage and the first metastable voltage in succession to induce the first metastable state therein.

24. The liquid crystal display of claim 21, wherein molecular directors of liquid crystal molecules in said chiral nematic liquid crystal medium interposing said alignment layer planar surfaces are oriented at an angle $\Theta$ therefrom.

25. The liquid crystal display of claim 21, wherein the first metastable state has a twist angle approaching $\phi_0 - 180°$.

26. The liquid crystal display of claim 25, wherein the second metastable state has a twist angle approaching $\phi_0 + 180°$.

27. The liquid crystal display of claim 21, wherein the second metastable state has a twist angle approaching $\phi_0 + 180°$.

28. A method for driving a liquid crystal display incorporating a twisted nematic liquid crystal medium interposing a pair of electrode substrates having alignment layers formed on their respective surfaces, the nematic liquid crystal medium having a twisted structure with a twist angle $\phi$ in a preselected state comprising one of a first metastable state, a second metastable state, a reset state, and an arbitrary state, said method comprising the steps of:

(A) applying a reset voltage across the liquid crystal display electrodes to induce a transition from the preselected state to the reset state in the nematic liquid crystal medium; and (B) applying a first metastable voltage greater than a critical voltage and less than the reset voltage to place the nematic liquid crystal medium in the first metastable state.

29. The liquid crystal display driving method of claimer 28, wherein the preselected state of the nematic liquid crystal medium is the first metastable state.

30. The liquid crystal display driving method of claim 28, wherein the preselected state of the nematic liquid crystal medium is the second metastable state.

31. The liquid crystal display driving method of claim 28, wherein the arbitrary state includes an initial state having a twist angle $\phi_0$.

32. The liquid crystal display driving method of claim 31, wherein the first metastable state has a twist angle approaching $\phi_0-180°$.

33. The liquid crystal display driving method of claim 32, wherein the second metastable state has a twist angle approaching $\phi_0+180°$.

34. The liquid crystal display driving method of claim 31, wherein the second metastable state has a twist angle approaching $\phi_0+180°$.

35. The liquid crystal display driving method of claim 28, further comprising:

providing an orthogonally arranged scan electrode group and signal electrode group respectively formed on the substrates, wherein cross points of the electrodes represent picture cells; and time-shared addressing the electrode groups.

36. The liquid crystal display driving method of claim 35, wherein said reset voltage applying step (A) comprises applying the reset voltage simultaneously to all the picture elements before said time-shared addressing step.

37. The liquid crystal display driving method of claim 36, wherein said first metastable voltage applying step (B) comprises applying the first metastable voltage to all the picture elements before said time-shared addressing step.

38. The liquid crystal display driving method of claim 35, wherein said reset voltage applying step (A) comprises applying the reset voltage to the picture elements on a sequential scan electrode group basis prior to said time-shared addressing step.

39. The liquid crystal display driving method of claim 38, wherein said first metastable voltage applying step (B) comprises applying the first metastable voltage to the picture elements on a sequential scan electrode group basis prior to said time-shared addressing step.

40. The liquid crystal display driving method of claim 28, wherein the first metastable state represents a relaxation state in the nematic liquid crystal medium;

wherein said reset voltage applying step (A) applies the reset voltage for a first time period to induce a Frederick's transition in the nematic liquid crystal medium; and wherein said first metastable voltage applying step (B) comprises:

applying a first metastable activation voltage less than the reset voltage and greater than the critical voltage for a second time period to place the nematic liquid crystal medium in the first metastable state; and thereafter applying a third voltage less than the critical voltage for a third time period to maintain the nematic liquid crystal medium in the first metastable state.

41. The liquid crystal display driving method of claim 40, wherein a selection period relative to said time-shared addressing step occurs during the first and second time periods and a nonselection period occurs during the third time period.

42. The liquid crystal display driving method of claim 40, wherein a selection period relative to said time-shared addressing step occurs during the second time period and a nonselection period occurs during the first and third time periods.

43. A method for driving a liquid crystal display incorporating a twisted nematic liquid crystal medium interposing a pair of electrode substrates having alignment layers formed on their respective surfaces, the nematic liquid crystal medium having a twisted structure with a twist angle $\phi$ in a preselected state comprising one of a first metastable state, a second metastable state, a reset state, and an arbitrary state, said method comprising the steps of:

(A) applying a reset voltage across the liquid crystal display electrodes to induce a transition from the preselected state to the reset state in the nematic liquid crystal medium; and (B) applying a second metastable voltage less than both a critical voltage and the reset voltage to place the nematic liquid crystal medium in the second metastable state.

44. The liquid crystal display driving method of claim 43, wherein the preselected state of the nematic liquid crystal medium is the first metastable state.

45. The liquid crystal display driving method of claim 43, wherein the preselected state of the nematic liquid crystal medium is the second metastable state.

46. The liquid crystal display driving method of claim 43, wherein the arbitrary state includes an initial state having a twist angle $\phi_0$.

47. The liquid crystal display driving method of claim 46, wherein the first metastable state has a twist angle approaching $\phi_0-180°$.

48. The liquid crystal display driving method of claim 47, wherein the second metastable state has a twist angle approaching $\phi_0+180°$.

49. The liquid crystal display driving method of claim 46, wherein the second metastable state has a twist angle approaching $\phi_0+180°$.

50. The liquid crystal display driving method of claim 43, further comprising:

providing an orthogonally arranged scan electrode group and signal electrode group respectively formed on the substrates, wherein cross points of the electrodes represent picture cells; and time-shared addressing the electrode groups.

51. The liquid crystal display driving method of claim 50, wherein said reset voltage applying step (A) comprises applying the reset voltage simultaneously to all the picture elements before said time-shared addressing step.

52. The liquid crystal display driving method of claim 51, wherein said second metastable voltage applying step (B) comprises applying the second metastable voltage to all the picture elements before said time-shared addressing step.

53. The liquid crystal display driving method of claim 50, wherein said reset voltage applying step (A) comprises applying the reset voltage to the picture elements on a sequential scan electrode group basis prior to said time-shared addressing step.

54. The liquid crystal display driving method of claim 53, wherein said second metastable voltage applying step (B) comprises applying the second metastable voltage to the picture elements on a sequential scan electrode group basis prior to said time-shared addressing step.

55. The liquid crystal display driving method of claim 50, wherein the second metastable state represents a relaxation state in the nematic liquid crystal medium;

wherein said reset voltage applying step (A) applies the reset voltage for a first time period to induce a Frederick's transition in the nematic liquid crystal medium; and wherein said second metastable voltage applying step (B) comprises:

applying a second metastable activation voltage less than both the reset voltage and the critical voltage for a second time period to place the nematic liquid crystal medium in the second metastable state; and thereafter applying a third voltage less than the second metastable state activation voltage for a third time period to maintain the nematic liquid crystal medium in the second metastable state.

56. The liquid crystal display driving method of claim 55, wherein a selection period relative to said time-shared addressing step occurs during the first and second time periods and a nonselection period occurs during the third time period.

57. The liquid crystal display driving method of claim 55, wherein a selection period relative to said time-shared addressing stop occurs during the second time period and a nonselection period occurs during the first and third time periods.

58. A liquid crystal display, comprising:

a chiral nematic liquid crystal medium interposing a pair of electrode substrates having alignment layers formed on their respective surfaces, said chiral nematic liquid crystal medium having a twisted structure with a twist angle $\phi_0$ in an initial state and having first and second metastable states which are different from the initial state and represent respective relaxation states in said liquid crystal medium; and a drive circuit in communication with said chiral nematic liquid crystal display for (a) applying a reset voltage across said chiral liquid crystal display electrodes to induce a transition from a preselected state, comprising one of the initial state, the first metastable state, and the second metastable state, to a reset state in said chiral nematic liquid crystal medium; and (b) after application of the reset voltage, applying one of:

(1) a first metastable activation voltage greater than a critical voltage and less than the reset voltage to place said chiral nematic liquid crystal medium in the first metastable state; and (2) a second metastable activation voltage less than both the critical voltage and the reset voltage to place said chiral nematic liquid crystal medium in the second metastable state.

59. The liquid crystal display of claim 58, wherein when the preselected state of said chiral nematic liquid crystal medium is the first metastable state, said drive circuit applies the reset voltage and the second metastable activation voltage in succession to induce the second metastable state therein.

60. The liquid crystal display of claim 58, wherein when the preselected state of said chiral nematic liquid crystal medium is the second metastable state, said drive circuit applies the reset voltage and the first metastable activation voltage in succession to induce the first metastable state therein.

61. The liquid crystal display of claim 58, wherein the first and second metastable states represent respective relaxation states in said chiral nematic liquid crystal medium after inducing a Frederick's transition therein.

62. The liquid crystal display of claim 58, wherein the drive circuit applies the reset voltage to induce a Frederick's transition in said chiral nematic liquid crystal medium.

63. The liquid crystal display of claim 58, wherein molecular directors of liquid crystal molecules in said chiral nematic liquid crystal medium interposing said alignment layer planar surfaces are oriented at an angle $\Theta$ therefrom.

64. The liquid crystal display of claim 58, wherein an orthogonally arranged scan electrode group and signal electrode group are respectively formed on said substrates, wherein cross points of said electrodes represent picture cells; and further comprising means coupled to said electrodes to provide time-shared addressing of said electrode groups.

65. The liquid crystal display of claim 64, wherein said drive circuit successively applies the reset voltage and one of said first and second metastable activation voltages to all said picture elements before said picture cells undergo time-shared addressing.

66. The liquid crystal display of claim 64, wherein said drive circuit applies the reset voltage and one of said first and second metastable activation voltages to said picture cells on a sequential scan electrode group basis.

67. The liquid crystal display of claim 64, wherein in said scan electrode group, n number of scan electrodes are divided into a plurality of electrode blocks comprising k ($k \leq n$) number of scan electrodes, each of said blocks being sequentially line scanned such that each screen frame is time-shared n/k times.

68. The liquid crystal display of claim 58, wherein said drive circuit successively applies:

the reset voltage for a first time period;

either metastable activation voltage for a second time period; and a third voltage less than either metastable activation voltage for a third time period.

69. The liquid crystal display of claim 68, wherein a selection period relative to said time-shared addressing occurs during the first and second time periods and a nonselection period occurs during the third time period.

70. The liquid crystal display of claim 68, wherein a selection period relative to said time-shared addressing occurs during the second time period and a nonselection period occurs during the first and third time periods.

71. The liquid crystal display of claim 68, wherein only scan electrodes including picture cells that must be rewritten with new data in a next succeeding screen frame are time-shared during the first and second time periods.

72. The liquid crystal display of claim 58, wherein the first metastable state has a twist angle approaching the $\phi_0-180°$.

73. The liquid crystal display of claim 72, wherein the second metastable state has a twist angle approaching $\phi_0+180°$.

74. The liquid crystal display of claim 58, wherein the second metastable state has a twist angle approaching $\phi_0+180°$.

75. A method for driving a liquid crystal display incorporating a twisted nematic liquid crystal medium interposing a pair of electrode substrates having alignment layers formed on their respective surfaces, the nematic liquid crystal medium having a twisted structure with a twist angle $\phi$ in an initial state and having first and second metastable states which are different from the initial state and represent respective relaxation states, said method comprising the steps of:

(A) applying a reset voltage across the liquid crystal display electrodes to induce a transition from the preselected state, comprising one of said initial state, said first metastable state, and said second metastable state, to a reset state in the nematic liquid crystal medium; and (B) applying a first metastable voltage greater than a critical voltage and less than the reset voltage to place the nematic liquid crystal medium in the first metastable state.

76. The liquid crystal display driving method of claim 75, wherein the preselected state of the nematic liquid crystal medium is the first metastable state.

77. The liquid crystal display driving method of claim 75, wherein the preselected state of the nematic liquid crystal medium is the second metastable state.

78. The liquid crystal display driving method of claim 75, further comprising:

providing an orthogonally arranged scan electrode group and signal electrode group respectively formed on the substrates, wherein cross points of the electrodes represent picture cells; and time-shared addressing the electrode groups.

79. The liquid crystal display driving method of claim 78, wherein said reset voltage applying step (A) comprises applying the reset voltage simultaneously to all the picture elements before said time-shared addressing step.

80. The liquid crystal display driving method of claim 79, wherein said first metastable voltage applying step (B) comprises applying the first metastable voltage to all the picture elements before said time-shared addressing step.

81. The liquid crystal display driving method of claim 78, wherein said reset voltage applying step (A) comprises applying the reset voltage to the picture elements on a sequential scan electrode group basis prior to said time-shared addressing step.

82. The liquid crystal display driving method of claim 81, wherein said first metastable voltage applying step (B) comprises applying the first metastable voltage to the picture elements on a sequential scan electrode group basis prior to said time-shared addressing step.

83. The liquid crystal display driving method of claim 75, wherein said reset voltage applying step (A) applies the reset voltage for a first time period to induce a Frederick's transition in the nematic liquid crystal medium; and wherein said first metastable voltage applying step (B) comprises:

applying a first metastable activation voltage less than the reset voltage and greater than the critical voltage for a second time period to place the nematic liquid crystal medium in the first metastable state; and thereafter applying a third voltage less than the critical voltage for a third time period to maintain the nematic liquid crystal medium in the first metastable state.

84. The liquid crystal display driving method of claim 83, wherein selection period relative to said time-shared addressing step occurs during the first and second time periods and a nonselection period occurs during the third time period.

85. The liquid crystal display driving method of claim 83, wherein a selection period relative to said time-shared addressing step occurs during the second time period and a nonselection period occurs during the first and third time periods.

86. A method for driving a liquid crystal display incorporating a twisted nematic liquid crystal medium interposing a pair of electrode substrates having alignment layers formed on their respective surfaces, the nematic liquid crystal medium having a twisted structure with a twist angle φ in an initial state and having first and second metastable states representing respective relaxation states, said method comprising the steps of:

(A) applying a reset voltage across the liquid crystal display electrodes to induce a transition from a preselected state comprising one of said initial state, said first metastable state, and said second metastable state, to the reset state in the nematic liquid crystal medium; and (B) applying a second metastable voltage less than both a critical voltage and the reset voltage to place the nematic liquid crystal medium in the second metastable state.

87. The liquid crystal display driving method of claim 86, wherein the preselected state of the nematic liquid crystal medium is the first metastable state.

88. The liquid crystal display driving method of claim 86, wherein the preselected state of the nematic liquid crystal medium is the second metastable state.

89. The liquid crystal display driving method of claim 86, further comprising:

providing an orthogonally arranged scan electrode group and signal electrode group respectively formed on the substrates, wherein cross points of the electrodes represent picture cells; and time-shared addressing the electrode groups.

90. The liquid crystal display driving method of claim 89, wherein said reset voltage applying step (A) comprises applying the reset voltage simultaneously to all the picture elements before said time-shared addressing step.

91. The liquid crystal display driving method of claim 90, wherein said second metastable voltage applying step (B) comprises applying the second metastable voltage to all the picture elements before said time-shared addressing step.

92. The liquid crystal display driving method of claim 89, wherein said reset voltage applying step (A) comprises applying the reset voltage to the picture elements on a sequential scan electrode group basis prior to said time-shared addressing step.

93. The liquid crystal display driving method of claim 92, wherein said second metastable voltage applying step (B) comprises applying the second metastable voltage to the picture elements on a sequential scan electrode group basis prior to said time-shared addressing step.

94. The liquid crystal display driving method of claim 89, wherein wherein said reset voltage applying step (A) applies the reset voltage for a first time period to induce a Frederick's transition in the nematic liquid crystal medium; and wherein said second metastable voltage applying step (B) comprises:

applying a second metastable activation voltage less than both the reset voltage and the critical voltage for a second time period to place the nematic liquid crystal medium in the second metastable state; and thereafter applying a third voltage less than the second metastable state activation voltage for a third time period to maintain the nematic liquid crystal medium in the second metastable state.

95. The liquid crystal display driving method of claim 94, wherein a selection period relative to said time-shared addressing step occurs during the first and second time periods and a nonselection period occurs during the third time period.

96. The liquid crystal display driving method of claim 94, wherein a selection period relative to said time-shared addressing step occurs during the second time period and a nonselection period occurs during the first and third time periods.

* * * * *

UNITED STATES PATENT AND TRADEMARK OFFICE
CERTIFICATE OF CORRECTION

PATENT NO. : 5,594,464
DATED : January 14, 1997
INVENTOR(S) : Takaaki Tanaka, et al.

It is certified that errors appear in the above identified patent and that said Letters Patent is hereby corrected as shown below:

Column 24, line 65, delete "claimer" and insert --claim-- therefor.

Column 29, line 51, after "wherein" please insert --a--.

Signed and Sealed this

Tenth Day of June, 1997

Attest:

BRUCE LEHMAN

Attesting Officer

Commissioner of Patents and Trademarks